US007800876B2

(12) United States Patent
Peker et al.

(10) Patent No.: US 7,800,876 B2
(45) Date of Patent: Sep. 21, 2010

(54) FAULT DETECTION MECHANISM FOR LED BACKLIGHTING

(75) Inventors: Arkadiy Peker, New Hyde Park, NY (US); Dror Korcharz, Bat Yam (IL); David Pincu, Holon (IL); Simon Kahn, Jerusalem (IL)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 927 days.

(21) Appl. No.: 11/620,753

(22) Filed: Jan. 8, 2007

(65) Prior Publication Data

US 2007/0159750 A1 Jul. 12, 2007

Related U.S. Application Data

(60) Provisional application No. 60/756,991, filed on Jan. 9, 2006.

(51) Int. Cl.
*H02H 3/00* (2006.01)
*G09G 3/36* (2006.01)

(52) U.S. Cl. ........................................ 361/86; 345/102

(58) Field of Classification Search .................. 361/86; 345/102

See application file for complete search history.

(56) References Cited

U.S. PATENT DOCUMENTS

| | | | | |
|---|---|---|---|---|
| 5,986,647 | A | 11/1999 | Feldman | |
| 6,153,980 | A | 11/2000 | Marshall et al. | |
| 6,521,879 | B1 | 2/2003 | Rand et al. | |
| 6,816,816 | B2 * | 11/2004 | Slates et al. | 702/185 |
| 2002/0043943 | A1 | 4/2002 | Menzer et al. | |
| 2005/0231459 | A1 | 10/2005 | Furukawa | |
| 2005/0259439 | A1 | 11/2005 | Cull et al. | |
| 2006/0007097 | A1 | 1/2006 | Ichikawa | |
| 2006/0007103 | A1 | 1/2006 | Oh et al. | |
| 2006/0007110 | A1 | 1/2006 | Hung et al. | |
| 2006/0007112 | A1 | 1/2006 | Park | |

FOREIGN PATENT DOCUMENTS

WO 97/29320 A1 8/1997

* cited by examiner

*Primary Examiner*—Robert DeBeradinis
*Assistant Examiner*—Scott Bauer
(74) *Attorney, Agent, or Firm*—Simon Kahn

(57) ABSTRACT

A fault detection mechanism for a LED string comprising a plurality of serially connected LEDs, the fault detection mechanism comprising: a control circuitry; and a voltage measuring means, in communication with the control circuitry, arranged to measure the voltage drop across at least one LED of the LED string, the control circuitry being operable to: measure the voltage drop, via the voltage measuring means, at a plurality of times, compare at least two of the measured voltage drops, and in the event the comparison of the at least two voltage drops is indicative of one of a short circuit LED and an open circuit LED, output a fault indicator.

25 Claims, 12 Drawing Sheets

FAULT DETECTION MECHANISM FOR LED BACKLIGHTING

CROSS-REFERENCE TO RELATED APPLICATION

This application claims priority from provisional patent application Ser. No. 60/756,991 filed Jan. 9, 2006, entitled "Self Healing Mechanism for LED Backlighting", the entire contents of which is incorporated herein by reference.

BACKGROUND OF THE INVENTION

The present invention relates to the field of LED based lighting and more particularly to a fault detection mechanism for lighting based on a series LED string.

Light emitting diodes (LEDs) and in particular high intensity LED strings are rapidly coming into wide use for lighting applications. High intensity LEDs are sometimes called high power LEDs, high brightness LEDs, high current LEDs or super luminescent LEDs and are useful in a number of lighting applications including backlighting for liquid crystal display (LCD) based monitors and televisions, collectively hereinafter referred to as a monitor. In a large LCD monitor typically the high intensity LEDs are supplied in a string of serially connected high intensity LEDs, thus sharing a common current.

In order to supply a white backlight for the monitor one of two basic techniques are commonly used. In a first technique one or more strings of "white" LEDs are utilized, the white LEDs typically comprising a blue LED with a phosphor which absorbs the blue light emitted by the LED and emits a white light. In a second technique, individual strings of colored LEDs are placed in proximity so that in combination their light is seen a white light. Often, two strings of green LEDs are utilized to balance one string each of red and blue LEDs. Unfortunately, in either of the two techniques, in the event of a failure of a single LED in the string to conduct electricity, i.e. an open LED failure, the entire LED string fails to operate. An LED string is costly, and is typically only supplied today in high end LCD based monitors. Thus, disadvantageously according to the prior art, failure of a single LED in an LED string causes a partial failure of a high end LCD monitor.

In either of the two techniques, the strings of LEDs are typically located at one end or one side of the monitor, or in zones behind the monitor, the light being diffused to appear behind the LCD by a diffuser. In the case of colored LEDs additionally a mixer is required to ensure that the light of the colored LEDs are not viewed separately, but are rather mixed to give a white light. The white point of the light is an important factor to control, and much effort in design and manufacturing is centered on the need for a correct white point.

U.S. Patent Application Publication S/N US 2005/0231459 A1 published Oct. 20, 2005 to Furukawa is addressed to a constant current driving device for constant current driving of a plurality of elements connected in series with each other by a pulse width modulation constant current driving circuit includes: switching elements respectively connected in parallel with the plurality of elements connected in series with each other; a control circuit for performing control to bypass a driving current flowing through the other elements than an arbitrary element to be measured via the respective switching elements and pass a measuring driving current through only the element to be measured; and a detecting circuit for identifying an element at a faulty position by detecting the driving current flowing through the plurality of elements connected in series with each other.

Such a mechanism however requires bypassing the LEDs, with the exception of the LED being tested, which interferes with normal operation. Additionally, such a detection control unit is expensive, in that it requires an active switching element in parallel with each LED. Furthermore, in the event that strings of colored LEDs are supplied, no mechanism to compensate for lack of color balance, i.e. shift in white point, is provided and the LCD monitor will thus exhibit an improper color balance There is thus a long felt need for a simple fault detection mechanism capable of identifying a fault in an LED string. There is further a need for supplying a means of chromatic compensation for a failed colored LED in a backlighting string of an LCD monitor.

SUMMARY OF THE INVENTION

Accordingly, it is a principal object of the present invention to overcome the disadvantages of prior art. This is provided in the present invention by a fault detection mechanism operable to periodically measure the voltage drop across one of the LED string and each individual LED in the LED string. A plurality of measurements, preferably consecutive measurements, are compared, and in the event of a change in voltage drop indicative of one of a short circuit LED and an open circuit LED, a failure indicator is output.

Detection of a short circuit LED or an open LED in the LED string is preferably accomplished by a fault detection mechanism arranged to measure a voltage drop across each LED in the LED string. Preferably, an indication of the location or other identification of the failed LED in the LED string is transmitted to a chromatic control circuit of the LCD monitor. The chromatic control circuit is preferably operable to at least partially compensate for the failed LED by modifying the chromatic response associated with a transmissive portion of the LCD monitor to at least partially compensate for the identified failed LED.

In one embodiment, a passive self healing mechanism is further provided in parallel with each LED in the LED string, the passive self healing mechanism being arranged to bypass an open high intensity LED in response to the increased voltage drop. In another embodiment, a FET or other electronically controlled switch is provided for each LED in the LED string, the FET or other electronically controlled switch being arranged to create a bypass path for an open LED. In the event of a detected open LED in the LED string, the FET or other electronically controlled switch arranged in parallel with the open LED is closed thereby bypassing the open LED.

The invention provides for a fault detection mechanism for an LED string comprising a plurality of serially connected LEDs, the fault detection mechanism comprising: a control circuitry; and a voltage measuring means in communication with the control circuitry and arranged to measure the voltage drop across at least one LED of the LED string, the control circuitry being operable to: measure the voltage drop, via the voltage measuring means, at a plurality of times, compare at least two of the measured voltage drops, and in the event the comparison of the at least two voltage drops is indicative of one of a short circuit LED and an open circuit LED, output a fault indicator.

In one embodiment, the at least two measured voltage drops are consecutive measured voltage drops. In another embodiment, each of the plurality of LEDs is arranged with one of a serially connected diode string, a Zener diode and a voltage source connected in parallel thereto, each of the serially connected diode string, Zener diode and voltage source being configured to conduct at a voltage higher than the nominal operating voltage drop of the LED to which it is connected in parallel.

In one further embodiment, the difference between the voltage higher than the nominal operating voltage and the nominal operating voltage presents a voltage differential indicative of an open LED. In another further embodiment, in the event the difference between a first of the at least two measured voltages and a second of the at least two measured voltage drops is within a range of the difference between the voltage higher than the nominal operating voltage and the nominal operating voltage, the comparison is indicative of a open circuit LED.

In one embodiment, in the event the difference between a first of the at least two measured voltages and a second of the at least two measured voltage drops is within a range of an operating voltage drop across a single LED of the LED string, the comparison is indicative of a short circuit LED. In another embodiment, the fault detection mechanism further comprises: a multiplexer, responsive to the control circuitry, arranged to connect the voltage measuring means across each of the LEDs in the LED string in turn.

In one further embodiment, the control circuitry is further operable to transmit an indication of the particular LED associated with the fault indicator. In one yet further embodiment, the fault detection mechanism further comprises an LCD chromatic control operable responsive to the transmitted indication of the particular LED associated with the fault indicator, to adjust the color response of the liquid crystal display to at least partially compensate for the detected LED associated with the fault indicator. In one further embodiment, the fault detection mechanism further comprises a control unit responsive to the transmitted indication, the control unit being operable to adjust a PWM control thereby at least partially compensating for the particular LED associated with the fault indicator.

In one embodiment the LED string is configured for use in backlighting one of a monitor and a television. In another embodiment the fault detection mechanism further comprises: a plurality of field effect transistors, one of each of the plurality of field effect transistors being connected across a unique one of the plurality of LEDs in the LED string and being responsive to an output of the control circuitry; the control circuitry being further operable, in the event the comparison is indicative of an open circuit LED, to operate the field effect transistor connected across the open circuit LED so as to conduct current. In one further embodiment the fault detection mechanism further comprises: a multiplexer, responsive to the control circuitry, arranged to connect the voltage measuring means across each of the LEDs in the LED string in turn; and a control unit in communication with the fault indicator, wherein the control circuitry is further operable to transmit an indication of the particular LED associated with the fault indicator, and wherein the control unit is further operable to disable at least one LED thereby at least partially compensating for the one of a short circuit LED and an open circuit LED.

The invention independently provides for a method of fault detection comprising: providing an LED string comprising a plurality of LEDs; measuring a voltage drop across at least one LED of the provided LED string at a plurality of times; comparing at least two of the measured voltage drops; and outputting, in the event the comparison of the at least two voltage drops is indicative of one of a short circuit LED and an open circuit LED, a fault indicator.

In one embodiment the at least two measured voltage drops are consecutive measured voltage drops. In another embodiment the method further comprises: providing, associated with each LED of the provided LED string one of a serially connected diode string, a Zener diode and a voltage source connected in parallel thereto; and configuring each of the one of a serially connected diode string, Zener diode and voltage source to conduct at a voltage higher than the nominal operating voltage drop of the LED to which it is connected in parallel.

In one further embodiment the difference between the voltage higher than the nominal operating voltage and the nominal operating voltage presents a voltage differential indicative of an open LED. In another further embodiment, in the event the difference between a first of the at least two measured voltages and a second of the at least two measured voltage drops is within a range of the difference between the voltage higher than the nominal operating voltage and the nominal operating voltage, the comparison is indicative of a open circuit LED.

In one embodiment, in the event the difference between a first of the at least two measured voltages and a second of the at least two measured voltage drops is within a range of an operating voltage drop across a single LED of the LED string, the comparison is indicative of a short circuit LED. In another embodiment the method further comprises: determining the particular LED associated with the fault indicator; and outputting an indication of the particular LED associated with the fault indicator. In one further embodiment the method further comprises: adjusting a color response of a liquid crystal display associated with the provided LED string to at least partially compensate for the particular LED associated with the fault indicator. In another further embodiment the method further comprises: adjusting a PWM control thereby at least partially compensating for the particular LED associated with the fault indicator.

In one embodiment the method further comprises: enabling, in the event the fault indicator is indicative of an open circuit LED, a parallel conductive path around the open circuit LED. In another embodiment the method further comprises: disabling at least one LED thereby at least partially compensating for the one of a short circuit LED and an open circuit LED.

The invention further provides for a method of fault detection comprising: measuring a voltage drop across at least one LED of an LED string at a plurality of times; comparing at least two of the measured voltage drops; and outputting, in the event the comparison of the at least two voltage drops is indicative of one of a short circuit LED and an open circuit LED, a fault indicator. Preferably, the at least two measured voltage drops are consecutive measured voltage drops Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1A:
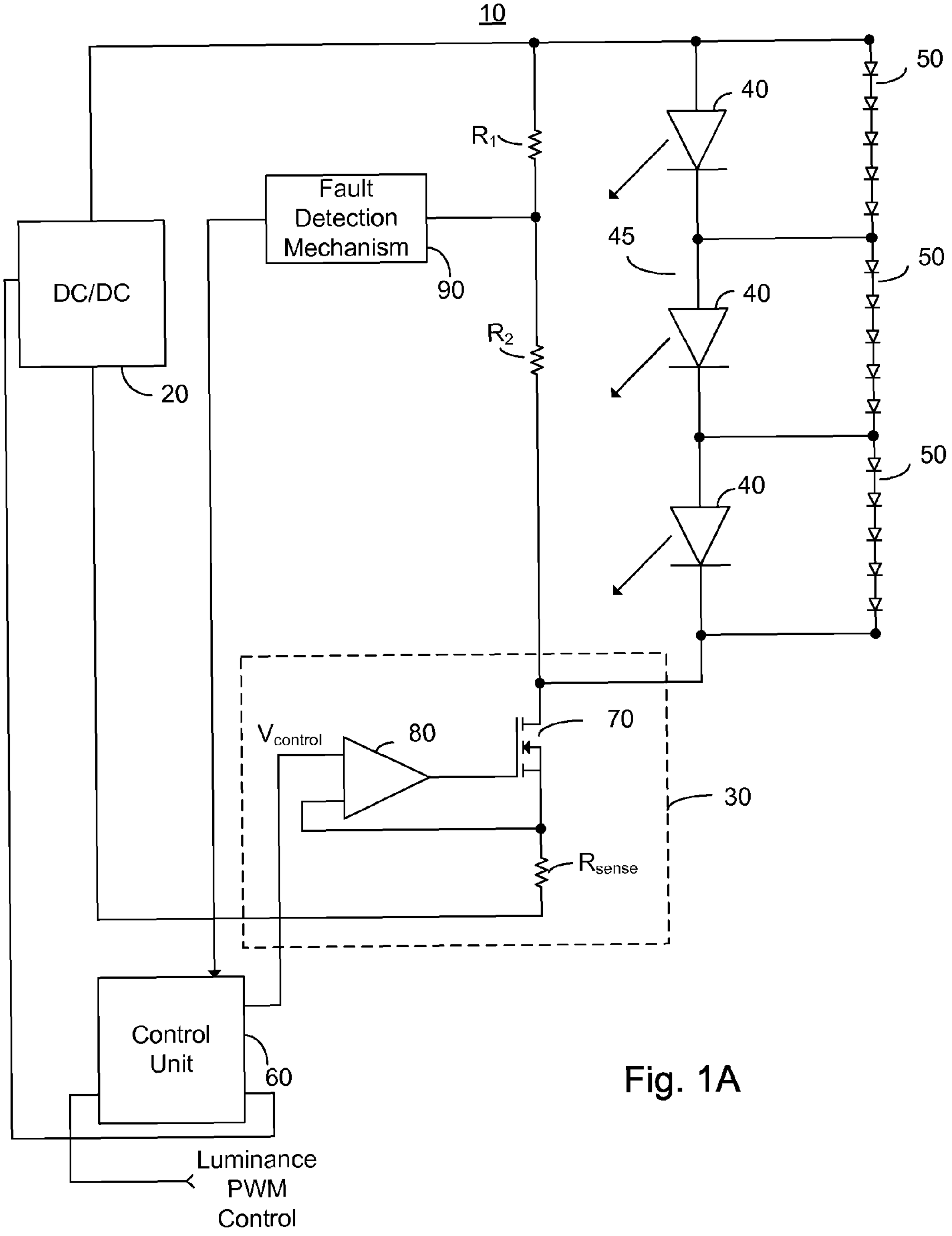
FIG. 1A illustrates a high level schematic diagram of a first embodiment of a passive element arranged to bypass an open LED in an LED string in accordance with a principle of the invention, in which a fault detection mechanism is provided to detect the presence of an open or shorted LED in the LED string.

The present embodiments enable a fault detection mechanism operable to periodically measure the voltage drop across one of the LED string and each individual LED in the LED string. A plurality of measurements, preferably consecutive measurements, are compared, and in the event of a change in voltage drop indicative of one of a short circuit LED and an open circuit LED, a failure indicator is output.

Detection of a short circuit LED or an open LED in the LED string is preferably accomplished by a fault detection mechanism arranged to measure a voltage drop across each LED in the LED string. Preferably, an indication of the location or other identification of the failed LED in the LED string is transmitted to a chromatic control circuit of the LCD monitor. The chromatic control circuit is preferably operable to at least partially compensate for the failed LED by modifying the chromatic response associated with a transmissive portion of the LCD monitor to at least partially compensate for the identified failed LED.

In one embodiment, a passive self healing mechanism is further provided in parallel with each LED in the LED string, the passive self healing mechanism being arranged to bypass an open LED in response to the increased voltage drop. In another embodiment, a FET or other electronically controlled switch is provided for each LED in the LED string, the FET or other electronically controlled switch being arranged to create a bypass path for an open LED. In the event of a detected open LED in the LED string, the FET or other electronically controlled switch arranged in parallel with the open LED is closed thereby bypassing the open LED.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1A illustrates a high level schematic diagram of a first embodiment 10 of a passive element arranged to bypass an open LED in an LED string in accordance with a principle of the invention, in which a fault detection mechanism is provided to detect the presence of an open or shorted LED in the LED string. Embodiment 10 comprises a DC/DC converter 20; a constant current control 30; a plurality of LEDs 40 connected serially to form an LED string 45; a plurality of protection diode strings 50; a control unit 60; a voltage divider comprising a first resistor $R_1$ and a second resistor $R_2$; and a fault detection mechanism 90. Constant current control 30 comprises a field effect transistor (FET) 70, a comparator and FET driver 80 and a sense resistor $R_{sense}$. FET 70 is illustrated as an N Channel MOSFET, however this is not meant to be limiting in any way, and FET 70 may be replaced with a P channel MOSFET, a bipolar transistor, or any other electronically controlled switch without exceeding the scope of the invention. FET 70 is advantageously shown as integrated within constant current control 30, which is preferably supplied as an ASIC, however this is not meant to be limiting in any way. FET 70 may be supplied externally without exceeding the scope of the invention.

A protection diode string 50 is connected in parallel with each LED 40 of LED string 45. The positive output of DC/DC converter 20 is connected to one end of $R_1$, the anode of the first LED 40 of LED string 45 and the anode of the protection diode string 50 which is connected in parallel to the first LED 40 of LED string 45. $R_1$ and $R_2$ are connected to form a voltage divider across LED string 45, and the input of fault detection mechanism 90 is connected to receive the divided voltage. The cathode of the last LED 40 of LED string 45 is connected to the drain of FET 70, and the source of FET 70 is connected through sense resistor $R_{sense}$ to the return of DC/DC converter 20. One input of comparator and FET driver 80 is connected to the source of FET 70 and the other input is connected to a voltage controlled reference $V_{control}$ supplied by control unit 60. The output of comparator and FET driver 80 is connected to the gate of FET 70. DC/DC converter 20 is further connected to an output of control unit 60, and the output of fault detection mechanism 90 is connected to control unit 60. Control unit 60 further receives an input from a luminance pulse width modulation (PWM) control.

In operation, comparator and FET driver 80 is connected to receive a voltage value reflective of the current flowing through the combination of LED string 45 and the parallel connected protection diode strings 50 as sensed by the voltage drop across sense resistor $R_{sense}$, and compare the voltage drop to control voltage $V_{control}$ supplied by control unit 60. $V_{control}$ determines the amount of current flowing through the combination of LED string 45 and the parallel connected protection diode strings 50 and is preferably pulsed, responsive to the luminance PWM control input, via an enable connection (not shown). In the event any of the plurality of LEDs 40 exhibits an open condition, the voltage drop across the open LED 40 rises until conduction is enabled through the associated protection diode string 50. The number of diodes in protection diode string 50 is selected so that when the associated LED 40 is conducting, no appreciable current is carried by protection diode string 50. In one non-limiting example in which the forward voltage drop across LED 40 in operation is 3.4 volts, and the forward voltage drop across each of the diodes constituting protection diode string 50 is 0.7 volts, a minimum of 5 protection diodes, and preferably at least 6 protection diodes are utilized in each protection diode string 50. Thus, in the event of an open condition in any LED 40, current will bypass the open LED 40 and automatically flow through protection diode string 50. Further preferably, the voltage drop present across protection diode string 50 is set so that no current flows through protection diode string 50 during the normal range of operation of the associated LED 40, and is further set high enough so that fault detection mechanism 90 is able to identify the voltage change and thus identify the failed one or more LED 40. Preferably, the forward voltage drop of protection diode string 50 is minimized with the above criteria in mind so as to minimize power dissipation across protection diode string 50.

The voltage divider comprising resistance $R_1$, $R_2$ inputs a representation of the voltage drop across LED string 45 to fault detection mechanism 90. Fault detection mechanism 90 is operable to determine, based on the input voltage representation, a status of LED string 45. In particular, in the event that the voltage representation at the input to fault detection mechanism 90 is within the range representative of the nominal voltage drop across the LEDs 40 in LED string 45, fault detection mechanism 90 outputs an indication to control unit 60 that all LEDs 40 are in operation. Fault detection mechanism 90 periodically measures the input voltage representation, and compares the current value with at least one previous value. Fault detection mechanism 90 comprises a comparison functionality operable to detect changes in value above a certain threshold indicative of an open or short circuit condition for a single LED 40 in LED string 45. Preferably, periodic measurement and comparison is accomplished between values relatively close in time, and thus changes in voltage drop due to aging and temperature are not detected as a failure.

In the event that an LED 40 exhibits an open condition, the voltage drop across LED string 45 rises by the difference between the nominal operating forward voltage drop of a single LED 40 and the nominal operating forward voltage drop of a single protection diode string 50. A portion of this increase in voltage drop is presented at the input to fault detection mechanism 90, which responsive to the sensed increased voltage drop outputs an indication of a single failed open LED 40 to control unit 60.

In the event than an LED 40 of LED string 45 presents a short circuit failure, the voltage drop across LED string 45 falls by the nominal operating forward voltage drop of a single LED 40. A portion of this decrease in voltage drop is presented at the input to fault detection mechanism 90, which responsive to the sensed decreased voltage drop outputs an indication of a failed shorted LED 40 to control unit 60.

DC/DC converter 20 is responsive to an output of control unit 60 so at match its output voltage to the voltage drop required across the combination of LED string 45 and protection diode strings 50 thereby minimizing power loss.

In one embodiment, control unit 60 responsive to an indication of one or more failed LEDs 40, adjusts the voltage output of DC/DC converter 20 and/or voltage control $V_{control}$ to modify the current flowing through the combination of LED string 45 and protection diode string 50. In one embodiment, in response to a failure indication either the overall current is increased or the duty cycle of the PWM controller (not shown), as represented by the luminance PWM control input, is modified to ensure a constant luminance output despite the failed LED 40. In another embodiment a signal indicating that repair is required is communicated for attention by service personnel.

The above has been described in relation to a single failure, however this is not meant to be limiting in any way. Multiple failures of LEDs 40, and any combination of short circuits and open circuits can be similarly ascertained and reported without exceeding the scope of the invention, since the voltage change is additive. Advantageously, LED string 45 continues to conduct and output light from the remaining operating LEDs 40 in LED string 45. Disadvantageously, the current flow through the conducting protection diode string 50 is dissipated as heat. Further disadvantageously, in the event LED string 45 represents color LEDs and thus a plurality of embodiments 10 are present, each embodiment 10 comprising a single color LED string 45, the color balance of the LCD monitor will be disturbed.

Figure 1B:
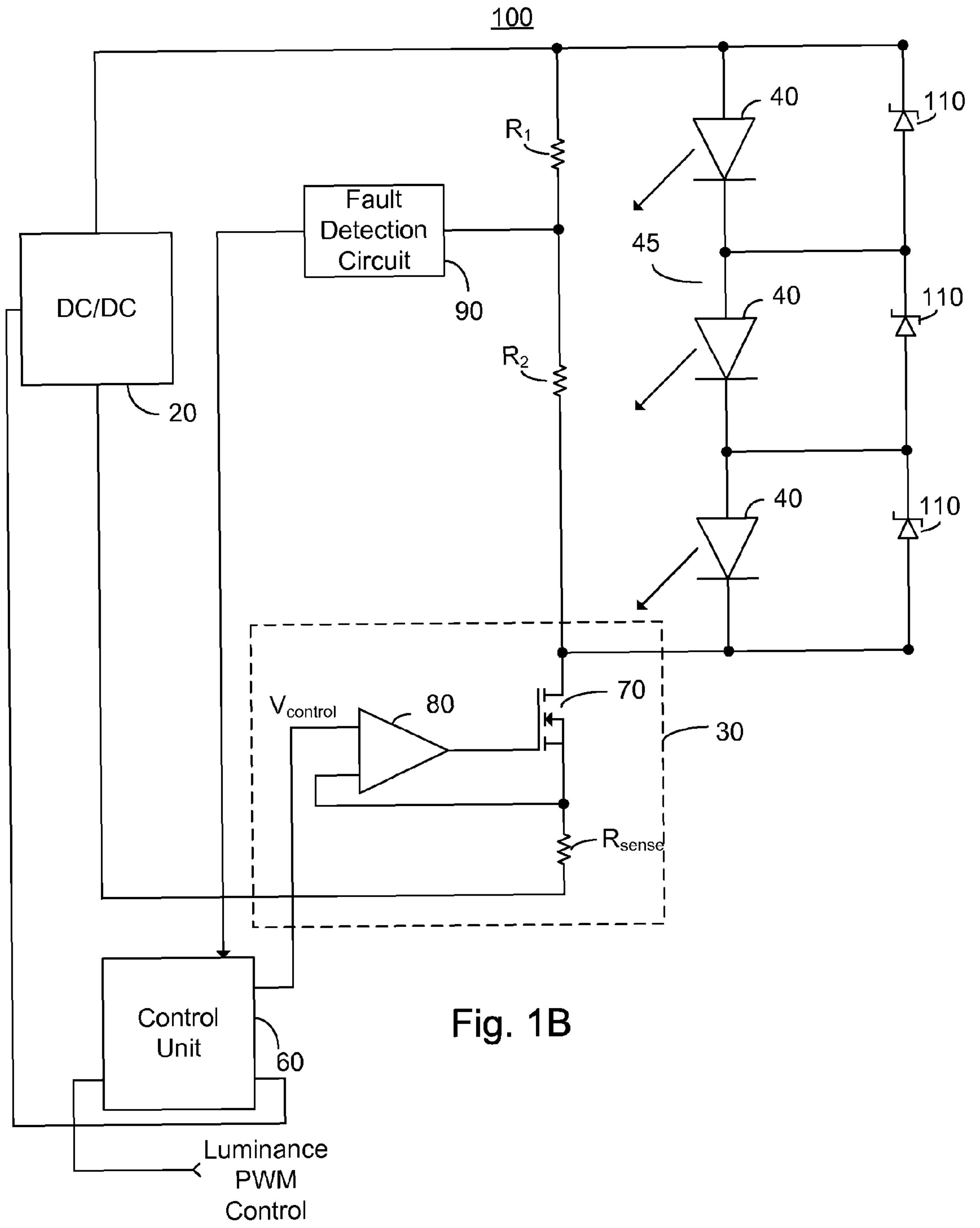
FIG. 1B illustrates a high level schematic diagram of a second embodiment of a passive element arranged to bypass an open LED in an LED string in accordance with a principle of the invention, in which a fault detection mechanism is provided to detect the presence of an open or shorted LED in the LED string.

FIG. 1B illustrates a high level schematic diagram of a second embodiment 100 of a passive element arranged to bypass an open LED in an LED string in accordance with a principle of the invention, in which a fault detection mechanism is provided to detect the presence of an open or shorted LED in the LED string. Embodiment 100 comprises a DC/DC converter 20; a constant current control 30; a plurality of LEDs 40 connected serially to form a LED string 45; a plurality of Zener or breakdown diodes 110; a control unit 60; a voltage divider comprising a first resistor $R_1$ and a second resistor $R_2$; and a fault detection mechanism 90. Constant current control 30 comprises an FET 70, a comparator and FET driver 80 and a sense resistor $R_{sense}$. FET 70 is illustrated as an N Channel MOSFET, however this is not meant to be limiting in any way, and FET 70 may be replaced with a P channel MOSFET, a bipolar transistor, or any other electronically controlled switch without exceeding the scope of the invention. FET 70 is advantageously shown as integrated within constant current control and fault detection mechanism 30, which is preferably supplied as an ASIC, however this is not meant to be limiting in any way. FET 70 may be supplied externally without exceeding the scope of the invention.

A Zener or breakdown diode 110 is connected in parallel with each LED 40 of LED string 45. The positive output of DC/DC converter 20 is connected to one end of $R_1$, the anode of the first LED 40 of LED string 45 and the cathode of the Zener or breakdown diode 110 which is connected in parallel to the first LED 40 of LED string 45. $R_1$ and $R_2$ are connected to form a voltage divider across LED string 45, and the input of fault detection mechanism 90 is connected to receive the divided voltage. The cathode of the last LED 40 of LED string 45 is connected to the drain of FET 70, and the source of FET 70 is connected through sense resistor $R_{sense}$ to the return of DC/DC converter 20. One input of comparator and FET driver 80 is connected to the source of FET 70 and the other input is connected to a voltage controlled reference $V_{control}$ supplied by control unit 60. The output of comparator and FET driver 80 is connected to the gate of FET 70. DC/DC converter 20 is further connected to an output of control unit 60, and the output of fault detection mechanism 90 is connected to control unit 60. Control unit 60 further receives an input from a luminance PWM control.

In operation, comparator and FET driver 80 is connected to receive a voltage value reflective of the current flowing through the combination of LED string 45 and the parallel connected Zener or breakdown diodes 110 as sensed by the voltage drop across sense resistor $R_{sense}$, and compare the voltage drop to control voltage $V_{control}$ supplied by control unit 60. $V_{control}$ determines the amount of current flowing through the combination of LED string 45 and the parallel connected Zener or breakdown diodes 110 and is preferably pulsed, responsive to the luminance PWM control input, via an enable connection (not shown). In the event of any of the plurality of LED 40 exhibiting an open condition, the voltage drop across the open LED 40 will rise until conduction is enabled through the associated Zener or breakdown diode 110. The breakdown voltage of Zener or breakdown diode 110 is selected so that when the associated LED 40 is conducting, no appreciable current is carried by Zener or breakdown diode 110. In one non-limiting example in which the forward voltage drop across LED 40 in operation is 3.4 volts, the breakdown voltage of Zener or breakdown diode 110 is preferably set at a minimum of 3.8 volts and preferably at 4 volts. Thus, in the event of an open condition in any LED 40, current will bypass the open LED 40 and automatically flow through the associated Zener or breakdown diode 110. Further preferably, the voltage drop present across Zener or breakdown diode 110 is set so that no current flows through protection Zener or breakdown diode 110 during the normal range of operation of the associated LED 40, and is further set high enough so that fault detection mechanism 90 is able to identify the voltage change and thus identify the failed one or more LED 40. Preferably, the breakdown voltage of Zener of breakdown diode 110 is minimized with the above criteria in mind so as to minimize power dissipation across Zener or breakdown diode 110.

The voltage divider comprising resistance $R_1$, $R_2$ inputs a representation of the voltage drop across LED string 45 to fault detection mechanism 90. Fault detection mechanism 90 is operable to determine, based on the input voltage representation, a status of LED string 45. In particular, in the event that the voltage representation at the input to fault detection mechanism 90 is within the range representative of the nominal voltage drop across the LEDs 40 in LED string 45, fault detection mechanism outputs an indication to control unit 60 that all LEDs 40 are in operation. Fault detection mechanism 90 periodically measures the input voltage representation, and compares the current value with at least one previous value. Fault detection mechanism 90 comprises a comparison functionality operable to detect changes in value above a certain threshold indicative of an open or short circuit condition for a single LED 40 in LED string 45. Preferably, periodic measurement and comparison is accomplished between values relatively close in time, and thus changes in voltage drop due to aging and temperature are not detected as a failure.

In the event that an LED 40 exhibits an open condition, the voltage drop across LED string 45 rises by the difference between the nominal operating forward voltage drop of a single LED 40 and the nominal breakdown voltage of a single Zener or breakdown diode 110. A portion of this increase in voltage drop is presented at the input to fault detection mechanism 90, which responsive to the sensed increased voltage drop outputs an indication of a single failed open LED 40 to control unit 60.

In the event that an LED 40 of LED string 45 presents a short circuit failure, the voltage drop across LED string 45 falls by the nominal operating forward voltage drop of a single LED 40. A portion of this decrease in voltage drop is presented at the input to fault detection mechanism 90, which responsive to the sensed decreased voltage drop outputs an indication of a single failed shorted LED 40 to control unit 60.

DC/DC converter 20 is responsive to an output of control unit 60 so at match its output voltage to the voltage drop required across the combination of LED string 45 and Zener of breakdown diodes 110 thereby minimizing power loss.

In one embodiment, control unit 60 responsive to an indication of one or more failed LEDs 40, adjust the voltage output of DC/DC converter 20 and/or voltage control $V_{control}$ to modify the current flowing through the combination of LED string 45 and Zener or breakdown diode 110. In one embodiment, in response to a failure indication either the overall current is increased or the duty cycle of the PWM controller (not shown), as represented by the luminance PWM control input, is modified to ensure a constant luminance output despite the failed LED 40. In another embodiment a signal indicating that repair is required is communicated for attention by service personnel.

The above has been described in relation to a single failure, however this is not meant to be limiting in any way. Multiple failures of LEDs 40, and any combination of short circuits and open circuits can be similarly ascertained and reported without exceeding the scope of the invention, since the voltage change is additive. Advantageously, LED string 45 continues to conduct and output light from the remaining operating LEDs 40 in LED string 45. Disadvantageously, the current flow through the conducting Zener or breakdown diode 110 is dissipated as heat. Further disadvantageously, in the event LED string 45 represents color LEDs and thus a plurality of embodiments 100 are present, each embodiment 100 comprising a single color LED string 45, the color balance of the LCD monitor will be disturbed.

Figure 1C:
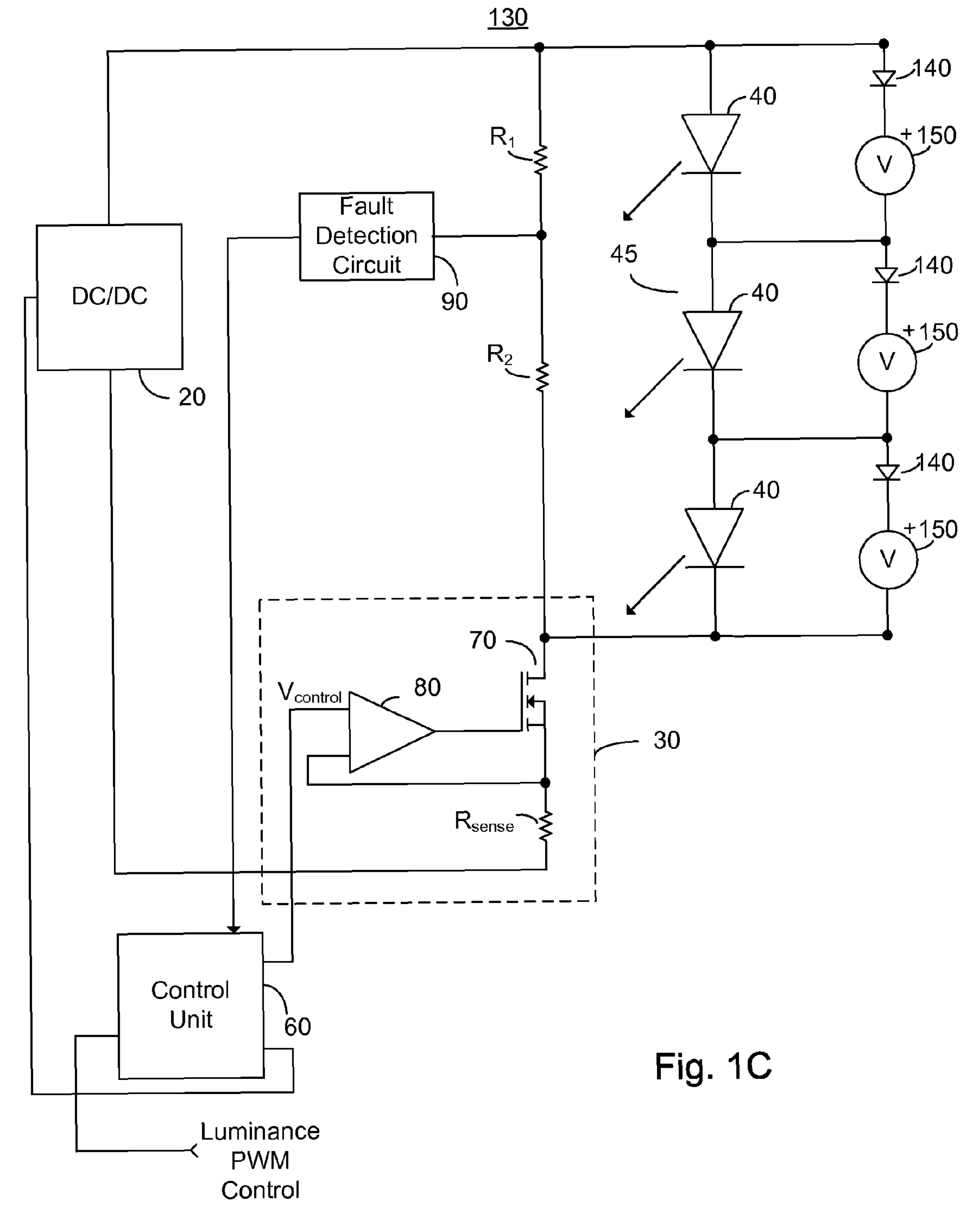
FIG. 1C illustrates a high level schematic diagram of a third embodiment of a passive element arranged to bypass an open LED in an LED string in accordance with a principle of the invention, in which a fault detection mechanism is provided to detect the presence of an open or shorted LED in the LED string.

FIG. 1C illustrates a high level schematic diagram of a third embodiment 130 of a passive element arranged to bypass an open LED in an LED string in accordance with a principle of the invention, in which a fault detection mechanism is provided to detect the presence of an open or shorted LED in the LED string. Embodiment 130 comprises a DC/DC converter 20; a constant current control 30; a plurality of LEDs 40 connected serially to form an LED string 45; a plurality of diodes 140 each serially connected to a voltage source 150; a control unit 60; a voltage divider comprising a first resistor $R_1$ and a second resistor $R_2$; and a fault detection mechanism 90. Constant current control 30 comprises a field effect transistor (FET) 70, a comparator and FET driver 80 and a sense resistor $R_{sense}$. FET 70 is illustrated as an N Channel MOSFET, however this is not meant to be limiting in any way, and FET 70 may be replaced with a P channel MOSFET, a bipolar transistor, or any other electronically controlled switch without exceeding the scope of the invention. FET 70 is advantageously shown as integrated within constant current control 30, which is preferably supplied as an ASIC, however this is not meant to be limiting in any way. FET 70 may be supplied externally without exceeding the scope of the invention.

A serially connected diode 140 and voltage source 150 is connected in parallel with each LED 40 of LED string 45 and arranged to conduct only in the event that the voltage drop across the respective LED 40 is greater than the forward voltage drop of diode 140 and the voltage presented by voltage source 150. The positive output of DC/DC converter 20 is connected to one end of $R_1$, the anode of the first LED 40 of LED string 45 and the positive end of the serially connected diode 140 and voltage source 150 which is connected in parallel to the first LED 40 of LED string 45. $R_1$ and $R_2$ are connected to form a voltage divider across LED string 45, and the input of fault detection mechanism 90 is connected to receive the divided voltage. The cathode of the last LED 40 of LED string 45 is connected to the drain of FET 70, and the source of FET 70 is connected through sense resistor $R_{sense}$ to the return of DC/DC converter 20. One input of comparator and FET driver 80 is connected to the source of FET 70 and the other input is connected to a voltage controlled reference $V_{control}$ supplied by control unit 60. The output of comparator and FET driver 80 is connected to the gate of FET 70. DC/DC converter 20 is further connected to an output of control unit 60, and the output of fault detection mechanism 90 is connected to control unit 60. Control unit 60 further receives an input from a luminance PWM control.

In operation, comparator and FET driver 80 is connected to receive a voltage value reflective of the current flowing through the combination of LED string 45 and the parallel connected serially connected diode 140 and voltage source 150 as sensed by the voltage drop across sense resistor $R_{sense}$, and compare the voltage drop to control voltage $V_{control}$ supplied by control unit 60. $V_{control}$ determines the amount of current flowing through the combination of LED string 45 and the parallel connected serially connected diode 140 and voltage source 150 and is preferably pulsed, responsive to the luminance PWM control input, via an enable connection (not shown). In the event of any of the plurality of LED 40 exhibits an open condition, the voltage drop across the open LED 40 rises until conduction is enabled through the associated serially connected diode 140 and voltage source 150. The value of voltage source 150 is selected so that when the associated LED 40 is conducting, no appreciable current is carried by serially connected diode 140 and voltage source 150. In one non-limiting example in which the forward voltage drop across LED 40 in operation is 3.4 volts, and the forward voltage drop of diode 140 if 0.7 volts, voltage source 150 is set at a minimum of 3.1 volts and preferably at 3.3 volts. Thus, in the event of an open condition in any LED 40, current will bypass the open LED 40 and automatically flow through the associated serially connected diode 140 and voltage source 150. Further preferably, the voltage drop present across diode 140 and voltage source 150 is set so that no current flows through diode 140 and voltage source 150 during the normal range of operation of the associated LED 40, and is further set high enough so that fault detection mechanism 90 is able to identify the voltage change and thus identify the failed one or more LED 40. Preferably, the voltage of voltage source 150 is minimized with the above criteria in mind so as to minimize power dissipation across diode 140 and voltage source 150.

The voltage divider comprising resistance $R_1$, $R_2$ inputs a representation of the voltage drop across LED string 45 to fault detection mechanism 90. Fault detection mechanism 90 is operable to determine, based on the input voltage representation, a status of LED string 45. In particular, in the event that the voltage representation at the input to fault detection mechanism 90 is within the range representative of the nominal voltage drop across the LEDs 40 in LED string 45, fault detection mechanism 90 outputs an indication to control unit 60 that all LEDs 40 are in operation. Fault detection mechanism 90 periodically measures the input voltage representation, and compares the current value with at least one previous value. Fault detection mechanism 90 comprises a comparison functionality operable to detect changes in value above a certain threshold indicative of an open or short circuit condition for a single LED 40 in LED string 45. Preferably, periodic measurement and comparison is accomplished between values relatively close in time, and thus changes in voltage drop due to aging and temperature are not detected as a failure.

In the event that an LED 40 exhibits an open condition, the voltage drop across LED string 45 rises by the difference between the nominal operating forward voltage drop of a single LED 40 and the nominal voltage drop across a single serially connected diode 140 and voltage source 150. A portion of this increase in voltage drop is presented at the input to fault detection mechanism 90, which responsive to the sensed increased voltage outputs an indication of a single failed open LED 40 to control unit 60.

In the event an LED 40 of LED string 45 presents a short circuit failure, the voltage drop across LED string 45 falls by the nominal operating forward voltage drop of a single LED 40. A portion of this decrease in voltage drop is presented at the input to fault detection mechanism 90, which responsive to the sensed decreased outputs an indication of a single failed shorted LED 40 to control unit 60.

DC/DC converter 20 is responsive to an output of control unit 60 so at match its output voltage to the voltage drop required across the combination of LED string 45 and diodes 140 and voltage sources 150 thereby minimizing power loss In one embodiment, control unit 60 responsive to an indication of one or more failed LEDs 40, adjust the voltage output of DC/DC converter 20 and/or voltage control $V_{control}$ to modify the current flowing through the combination of LED string 45 and serially connected diode 140 and voltage source 150. In one embodiment, in response to a failure indication either the overall current is increased or the duty cycle of the PWM controller (not shown), as represented by the luminance PWM control input, is modified to ensure a constant luminance output despite the failed LED 40. In another embodiment a signal indicating that repair is required is communicated for attention by service personnel.

The above has been described in relation to a single failure, however this is not meant to be limiting in any way. Multiple failures of LEDs 40, and any combination of short circuits and open circuits can be similarly ascertained and reported without exceeding the scope of the invention since the voltage change is additive. Advantageously, LED string 45 continues to conduct and output light from the remaining operating LEDs 40 in LED string 45. Disadvantageously, the current through the conducting serially connected diode 140 and voltage source 150 is dissipated as heat. Further disadvantageously, in the event LED string 45 represents color LEDs and thus a plurality of embodiments 10 are present, each embodiment 130 comprising a single color LED string 45, the color balance of the LCD monitor will be disturbed.

Figure 2A:
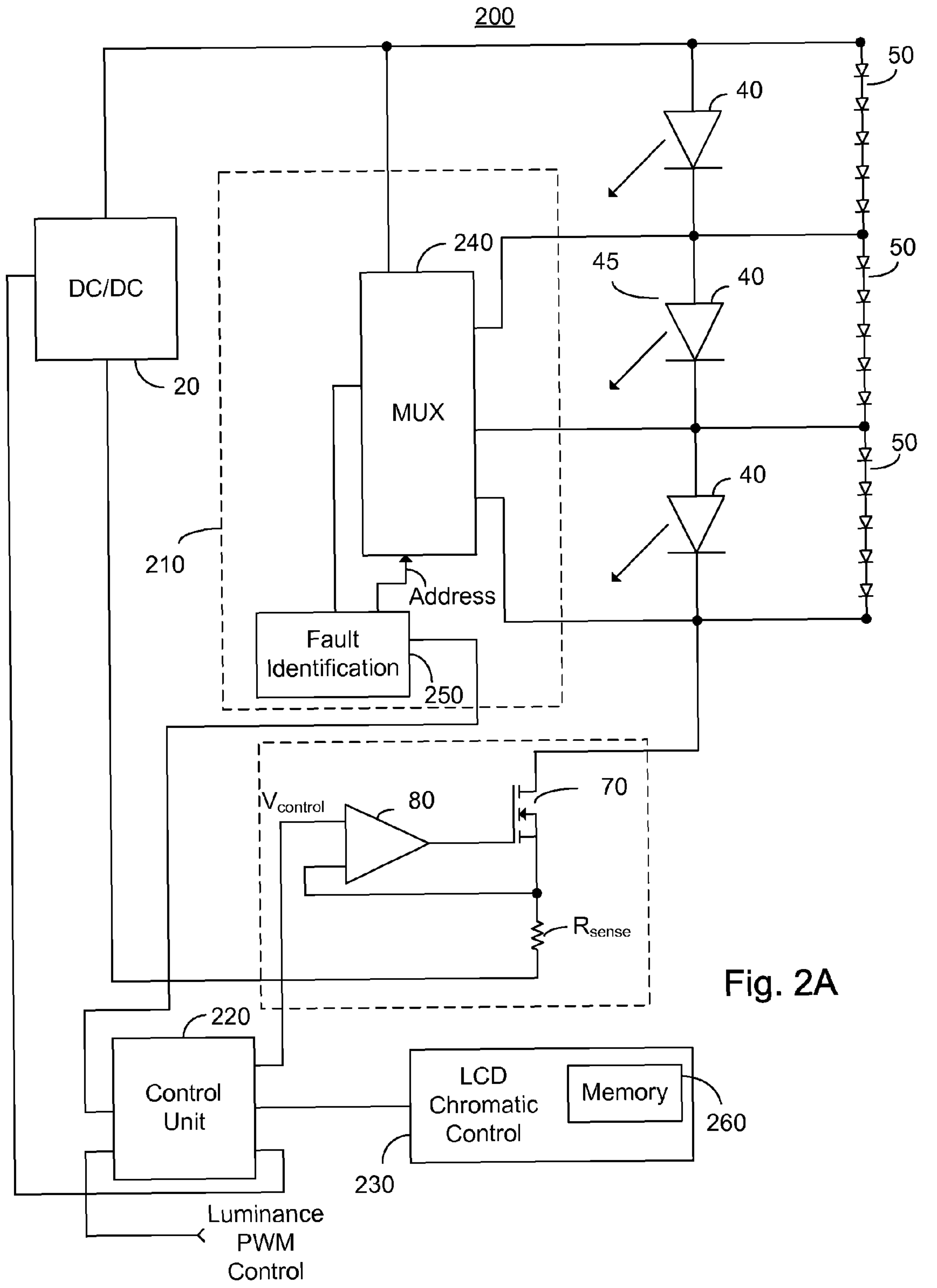
FIG. 2A illustrates a high level schematic diagram of a first embodiment of a passive element arranged to bypass an open LED in an LED string in accordance with a principle of the invention, in which a fault detection and identification mechanism is provided to detect the presence and identity of an open or shorted LED in the LED string.

FIG. 2A illustrates a high level schematic diagram of a first embodiment 200 of a passive element arranged to bypass an open LED in an LED string in accordance with a principle of the invention, in which a fault detection and identification mechanism is provided to detect the presence and identity of an open or shorted LED in the LED string.

Embodiment 200 comprises a DC/DC converter 20; a constant current control 30; a fault detection and identification mechanism 210; a plurality of LEDs 40 connected serially to form an LED string 45; a plurality of protection diode strings 50; a control unit 220; and an LCD chromatic control unit 230. LCD chromatic control unit 230 comprises a memory 260. Constant current control 30 comprises a FET 70, a comparator and FET driver 80, and a sense resistor $R_{sense}$. Fault detection and identification mechanism 210 comprises a multiplexer 240 and a fault detection and control mechanism 250. FET 70 is illustrated as an N Channel MOSFET, however this is not meant to be limiting in any way, and FET 70 may be replaced with a P channel MOSFET, a bipolar transistor, or any other electronically controlled switch without exceeding the scope of the invention. FET 70 is advantageously shown as integrated within constant current control 30, which is preferably supplied as an ASIC, however this is not meant to be limiting in any way. FET 70 may be supplied externally without exceeding the scope of the invention. Constant current control 30 and fault detection and identification mechanism 210 may be supplied as part of a single ASIC.

A protection diode string 50 is connected in parallel with each LED 40 of LED string 45. The positive output of DC/DC converter 20 is connected to the anode of the first LED 40 of LED string 45 and the anode of the protection diode string 50 which is connected in parallel to the first LED 40 of LED string 45. The cathode of the last LED 40 of LED string 45 is connected to the drain of FET 70, and the source of FET 70 is connected through sense resistor $R_{sense}$ to the return of DC/DC converter 20. One input of comparator and FET driver 80 is connected to the source of FET 70 and the other input is connected to a voltage controlled reference $V_{control}$ supplied by control unit 220. A further output of control unit 220 is connected to LCD chromatic control unit 230. Control unit 220 further receives an input from a luminance PWM control. The output of comparator and FET driver 80 is connected to the gate of FET 70 and DC/DC converter 20 is further connected to an output of control unit 220. The output of fault detection and control mechanism 250 is connected to control unit 220, an address control output of fault detection and control mechanism 250 is connected to multiplexer 240, and the output of multiplexer 240 is connected to the sensing input of fault detection and control mechanism 250. Multiplexer 240 exhibits a connection across each LED 40 of LED string 45.

In operation, comparator and FET driver 80 is connected to receive a voltage value reflective of the current flowing through the combination of LED string 45 and the parallel connected protection diode strings 50 as sensed by the voltage drop across sense resistor $R_{sense}$, and compare the voltage drop to control voltage $V_{control}$ supplied by control unit 220. $V_{control}$ determines the amount of current flowing through the combination of LED string 45 and the parallel connected protection diode strings 50 and is preferably pulsed, responsive to the luminance PWM control input, via an enable connection (not shown). In the event of any of the plurality of LEDs 40 exhibits an open condition, the voltage drop across the open LED 40 rises until conduction is enabled through the associated protection diode string 50. The number of diodes in protection diode string 50 is selected so that when the associated LED 40 is conducting, no appreciable current is carried by protection diode string 50. In one non-limiting example in which the forward voltage drop across LED 40 in operation is 3.4 volts, and the forward voltage drop across each of the diodes constituting protection diode string 50 is 0.7 volts, a minimum of 5 protection diodes, and preferably at least 6 protection diodes are utilized in each protection diode string 50. Thus, in the event of an open condition in any LED 40, current will bypass the open LED 40 and automatically flow through protection diode string 50. Further preferably, the voltage drop present across protection diode string 50 is set so that no current flows through protection diode string 50 during the normal range of operation of the associated LED 40, and is further set high enough so that fault detection and control mechanism 250 is able to identify the voltage change and thus the failed LED 40. Preferably, the voltage drop across protection diode string 50 is minimized with the above criteria in mind so as to minimize power dissipation across protection diode string 50.

Fault detection and control mechanism 250 operates multiplexer 240 to connect a voltage sensing input of fault detection and control mechanism 250 periodically in turn across each LED 40 of LED string 45. Fault detection and control mechanism 250 is operable to determine, based on the input voltage representation, a status of each LED 40 of LED string 45. In particular, in the event that the voltage representation at the input to fault detection and control mechanism 250 for each LED 40 is within the range representative of the nominal voltage drop across LED 40, fault detection and control mechanism 250 outputs an indication to control unit 220 that all LEDs 40 are in operation. Preferably, fault detection and control mechanism 250 further outputs data regarding the measured voltage drop. Fault detection and control mechanism 250 compares the current value of the voltage drop across each LED 40 with at least one previous value of the voltage drop across the respective LED 40. Fault detection and control mechanism 250 comprises a comparison functionality operable to detect changes in value above a certain threshold indicative of an open or short circuit condition for each LED 40 in LED string 45. Preferably, periodic measurement and comparison is accomplished between values relatively close in time, and thus changes in voltage drop due to aging and temperature are not detected as a failure.

In the event that a particular LED 40 exhibits an open condition, the voltage drop across the open LED 40 rises by the difference between the nominal operating forward voltage drop of the LED 40 previously measured and the operating forward voltage drop of a single protection diode string 50. This increase in voltage drop will be presented via multiplexer 240 at the input to fault detection and control mechanism 250, which responsive to the sensed increased voltage outputs an indication and identification of a single failed open LED 40 to control unit 220.

In the event that a particular LED 40 of LED string 45 presents a short circuit failure, the voltage drop across the short LED 40 will fall to zero from the previous operating forward voltage drop of the LED 40. This decrease in voltage drop presented via multiplexer 240 at the input to fault detection and control mechanism 250, which responsive to the sensed decreased outputs an indication and identification of the failed shorted LED 40 to control unit 220.

The voltage drop across each LED 40 is thus directly sensed, and an indication of the status is generated for each LED 40 and communicated to control unit 220. In an exemplary embodiment fault detection and identification mechanism receives a timing indication from the DC/DC control PWM circuit (not shown), and thus measures the voltage drop during the time of operation of LED 40. Preferably, fault detection and control mechanism 250 measures the voltage drop across each LED 40 of LED string 45 in a periodic round robin, thus receiving an indication of operation for each LED 40 in turn.

Fault detection and control mechanism 250 is preferably further operative to indicate the voltage drop across each LED 40 to control unit 220, as described above, so as to identify early aging of LED 40. Control unit 220, responsive to the voltage drop indication regarding each LED 40, is operative to identify a low output LED 40. Control unit 220 is further operative to transmit the identity of a low output LED 40 and/or the identity of a failed identified LED responsive to an indication and identification from fault detection and control mechanism 250 to LCD chromatic control unit 230. In an exemplary embodiment a low output LED 40 is identified by comparing the sensed voltage to a pre-stored table indicative of expected voltage values for each expected condition of the LEDs 40. In one embodiment the pre-stored table includes an offset for age and temperature, the age being continuously stored and updated as a running total based on the operation of LED string 45.

LCD chromatic control unit 230 operates, as will be described further hereinto below, to modify the chromatic response of the LCD matrix to at least partially compensate for the identified failed LED 40. Preferably, the chromatic response of the LCD matrix driver is modified in accordance with a table stored in memory 260, as will be described hereinto below in relation to FIGS. 4A-4B. LCD chromatic control 230 may further operate to communicate with control unit 220 so as to reduce or increase the output of the remaining active LEDs 40 via the operation of DC/DC converter 20, and adjust $V_{control}$ to increase or reduce the output of other LED strings 45 so as to more completely at least partially compensate for the failed LED 40. DC/DC converter 20 is responsive to an output of control unit 220 so at match its output voltage to the voltage drop required across the combination of LED string 45 and protection diode strings 50 thereby minimizing power loss.

Advantageously, LED string 45 continues to conduct and output light from the remaining operating LEDs 40 in LED string 45. Disadvantageously, the current through the conducting protection diode string 50 is dissipated as heat.

Figure 2B:
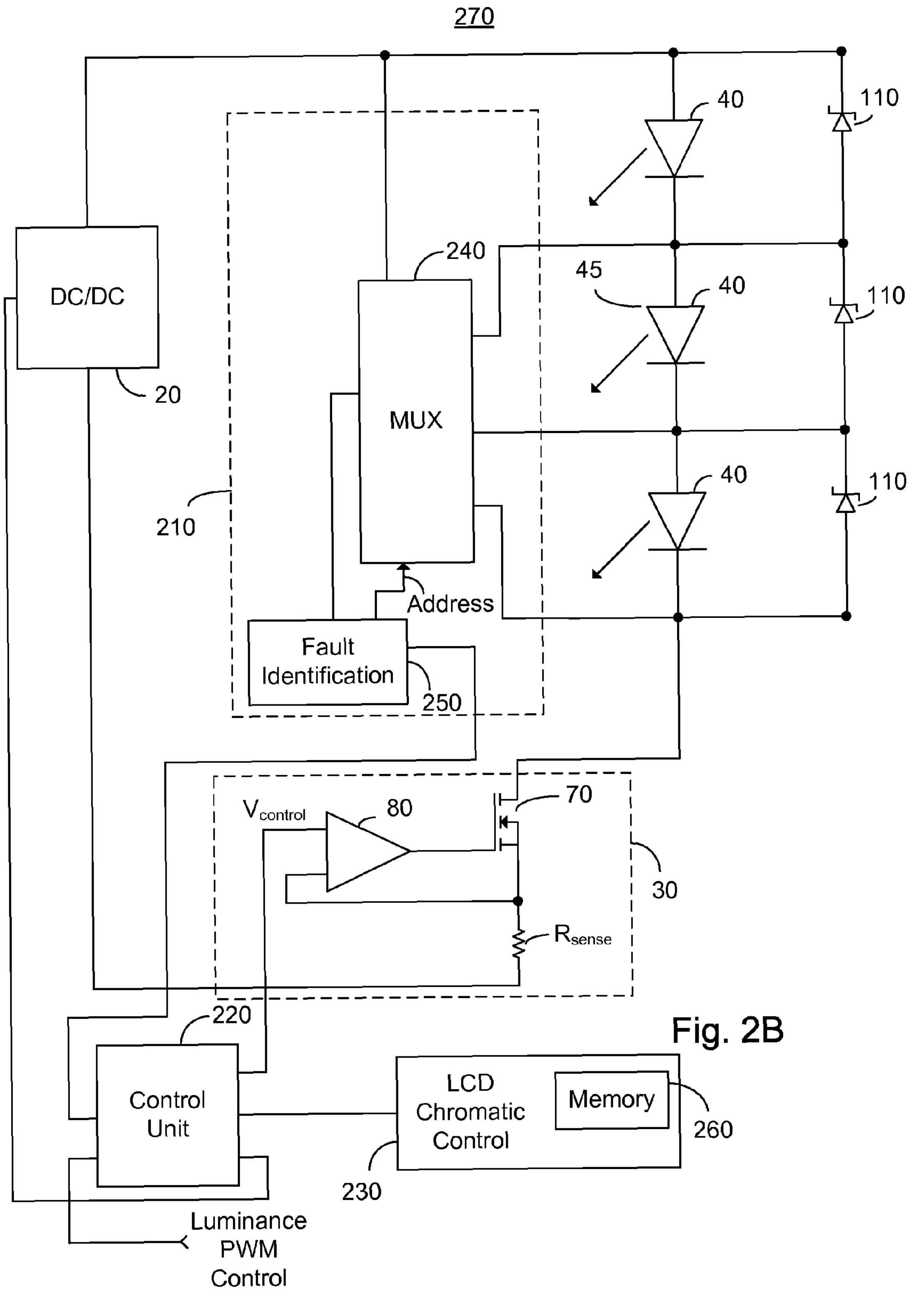
FIG. 2B illustrates a high level schematic diagram of a second embodiment of a passive element arranged to bypass an open LED in an LED string in accordance with a principle of the invention, in which a fault detection and identification mechanism is provided to detect the presence and identity of an open or shorted LED in the LED string.

FIG. 2B illustrates a high level schematic diagram of a second embodiment 270 of a passive element arranged to bypass an open LED in an LED string in accordance with a principle of the invention, in which a fault detection and identification mechanism is provided to detect the presence and identity of an open or shorted LED in the LED string.

Embodiment 270 comprises a DC/DC converter 20; a constant current control 30; a fault detection and identification mechanism 210; a plurality of LEDs 40 connected serially to form an LED string 45; a plurality of Zener or breakdown diodes 110; a control unit 220; and an LCD chromatic control unit 230. LCD chromatic control unit 230 exhibits a memory 260. Constant current control 30 comprises a FET 70, a comparator and FET driver 80, and a sense resistor $R_{sense}$. Fault detection and identification mechanism 210 comprises a multiplexer 240 and a fault detection and control mechanism 250. FET 70 is illustrated as an N Channel MOSFET, however this is not meant to be limiting in any way, and FET 70 may be replaced with a P channel MOSFET, a bipolar transistor, or any other electronically controlled switch without exceeding the scope of the invention. FET 70 is advantageously shown as integrated within constant current control and fault identification unit 210, which is preferably supplied as an ASIC, however this is not meant to be limiting in any way. FET 70 may be supplied externally without exceeding the scope of the invention. Constant current control 30 and fault detection and identification mechanism 210 may be supplied as part of a single ASIC.

A Zener or breakdown diode 110 is connected in parallel with each LED 40 of LED string 45. The positive output of DC/DC converter 20 is connected to the anode of the first LED 40 of LED string 45 and the cathode of the Zener or breakdown diode 110 which is connected in parallel to the first LED 40 of LED string 45. The cathode of the last LED 40 of LED string 45 is connected to the drain of FET 70, and the source of FET 70 is connected through sense resistor $R_{sense}$ to the return of DC/DC converter 20. One input of comparator and FET driver 80 is connected to the source of FET 70 and the other input is connected to a voltage controlled reference $V_{control}$ supplied by control unit 220. A further output of control unit 220 is connected to LCD chromatic control unit 230. Control unit 220 further receives an input from a PWM control. The output of comparator and FET driver 80 is connected to the gate of FET 70 and DC/DC converter 20 is further connected to an output of control unit 220. The output of fault detection and control mechanism 250 is connected to control unit 220, an address control output of fault detection and control mechanism 250 is connected to multiplexer 240, and the output of multiplexer 240 is connected to the sensing input of fault detection and control mechanism 250. Multiplexer 240 exhibits a connection across each LED 40 of LED string 45.

In operation, comparator and FET driver 80 is connected to receive a voltage value reflective of the current flowing through the combination of LED string 45 and the parallel connected Zener or breakdown diodes 110 as sensed by the voltage drop across sense resistor $R_{sense}$, and compare the voltage drop to control voltage $V_{control}$ supplied by control unit 220. $V_{control}$ determines the amount of current flowing through the combination of LED string 45 and the parallel connected Zener or breakdown diode 110 and is preferably pulsed, responsive to the luminance PWM control input, via an enable connection (not shown). In the event any of the plurality of LEDs 40 exhibits an open condition, the voltage drop across the open LED 40 rises until conduction is enabled through the associated Zener or breakdown diode 110. The breakdown voltage of Zener or breakdown diode 110 is selected so that when the associated LED 40 is conducting, no appreciable current is carried by Zener or breakdown diode 110. In one non-limiting example in which the forward voltage drop across LED 40 in operation is 3.4 volts, the breakdown voltage of Zener or breakdown diode 110 is preferably set at a minimum of 3.8 volts and preferably at 4 volts. Thus, in the event of an open condition in any LED 40, current will bypass the open LED 40 and automatically flow through the associated Zener or breakdown diode 110. Further preferably, the voltage drop present across the Zener or breakdown diode 110 is set so that no current flows through Zener or breakdown diode 110 during the normal range of operation of the associated LED 40, and is further set high enough so that fault detection and control mechanism 250 is able to identify the voltage change and thus identify the failed LED 40. Preferably, the breakdown voltage of Zener or breakdown diode 110 is minimized with the above criteria in mind so as to minimize power dissipation across Zener or breakdown diode 110.

Fault detection and control mechanism 250 operates multiplexer 240 to connect a voltage sensing input of fault detection and control mechanism 250 periodically in turn across each LED 40 of LED string 45. Fault detection and control mechanism 250 is operable to determine, based on the input voltage representation, a status of each LED 40 of LED string 45. In particular, in the event that the voltage representation at the input to fault detection and control mechanism 250 for each LED 40 is within the range representative of the nominal voltage drop across LED 40, fault detection and control mechanism 250 outputs an indication to control unit 220 that all LEDs 40 are in operation. Preferably, fault detection and control mechanism 250 further outputs data regarding the measured voltage drop. Fault detection and control mechanism 250 compares the current value of the voltage drop across each LED 40 with at least one previous value of the voltage drop across the respective LED 40. Fault detection and control mechanism 250 comprises a comparison functionality operable to detect changes in value above a certain threshold indicative of an open or short circuit condition for each LED 40 in LED string 45. Preferably, periodic measurement and comparison is accomplished between values relatively close in time, and thus changes in voltage drop due to aging and temperature are not detected as a failure.

In the event that a particular LED 40 exhibits an open condition, the voltage drop across the open LED 40 rises by the difference between the nominal operating forward voltage drop of the LED 40 previously measured and the operating reverse voltage drop of Zener or breakdown diode 110. This increase in voltage drop is presented via multiplexer 240 at the input to fault detection and control mechanism 250, which responsive to the sensed increased voltage drop outputs an indication and identification of a single failed open LED 40 to control unit 220.

In the event that a particular LED 40 of LED string 45 presents a short circuit failure, the voltage drop across the short LED 40 will fall to zero from the previous operating forward voltage drop of the LED 40. This decrease in voltage drop is presented via multiplexer 240 at the input to fault detection and control mechanism 250, which responsive to the sensed decreased voltage drop outputs an indication and identification of the failed shorted LED 40 to control unit 220.

The voltage drop across each LED 40 is thus directly sensed, and an indication of the status is generated for each LED 40 and communicated to control unit 220. In an exemplary embodiment fault detection and identification mechanism receives a timing indication from the DC/DC control PWM circuit (not shown), and thus measures the voltage drop during the time of operation of LED 40. Preferably, fault detection and control mechanism 250 measures the voltage drop across each LED 40 of LED string 45 in a periodic round robin, thus receiving an indication of operation for each LED 40 in turn.

Fault detection and control mechanism 250 is preferably further operative to indicate the voltage drop across each LED 40 to control unit 220, as described above, so as to identify early aging of LED 40. Control unit 220, responsive to the voltage drop indication regarding each LED 40, is operative to identify a low output LED 40. Control unit 220 is further operative to transmit the identity of a low output LED 40 and/or the identity of a failed identified LED responsive to an indication and identification from fault detection and control mechanism 250 to LCD chromatic control unit 230. In an exemplary embodiment a low output LED 40 is identified by comparing the sensed voltage to a pre-stored table indicative of expected voltage values for each expected condition of the LEDs 40. In one embodiment the pre-stored table includes an offset for age and temperature, the age being continuously stored and updated as a running total based on the operation of LED string 45.

LCD chromatic control unit 230 operates, as will be described further hereinto below, to modify the chromatic response of the LCD matrix to at least partially compensate for the identified failed LED 40. Preferably, the chromatic response of the LCD matrix driver is modified in accordance with a table stored in memory 260, as will be described hereinto below in relation to FIGS. 4A-4B. LCD chromatic control 230 may further operate to communicate with control unit 220 so as to reduce or increase the output of the remaining active LEDs 40 via the operation of DC/DC converter 20, and adjust $V_{control}$ to increase or reduce the output of other LED strings 45 so as to more completely at least partially compensate for the failed LED 40. DC/DC converter 20 is responsive to an output of control unit 220 so at match its output voltage to the voltage drop required across the combination of LED string 45 and Zener or breakdown diode 110 thereby minimizing power loss.

Advantageously, LED string 45 continues to conduct and output light from the remaining operating LEDs 40 in LED string 45. Disadvantageously, the current through the conducting protection Zener or breakdown diode 110 is dissipated as heat.

Figure 2C:
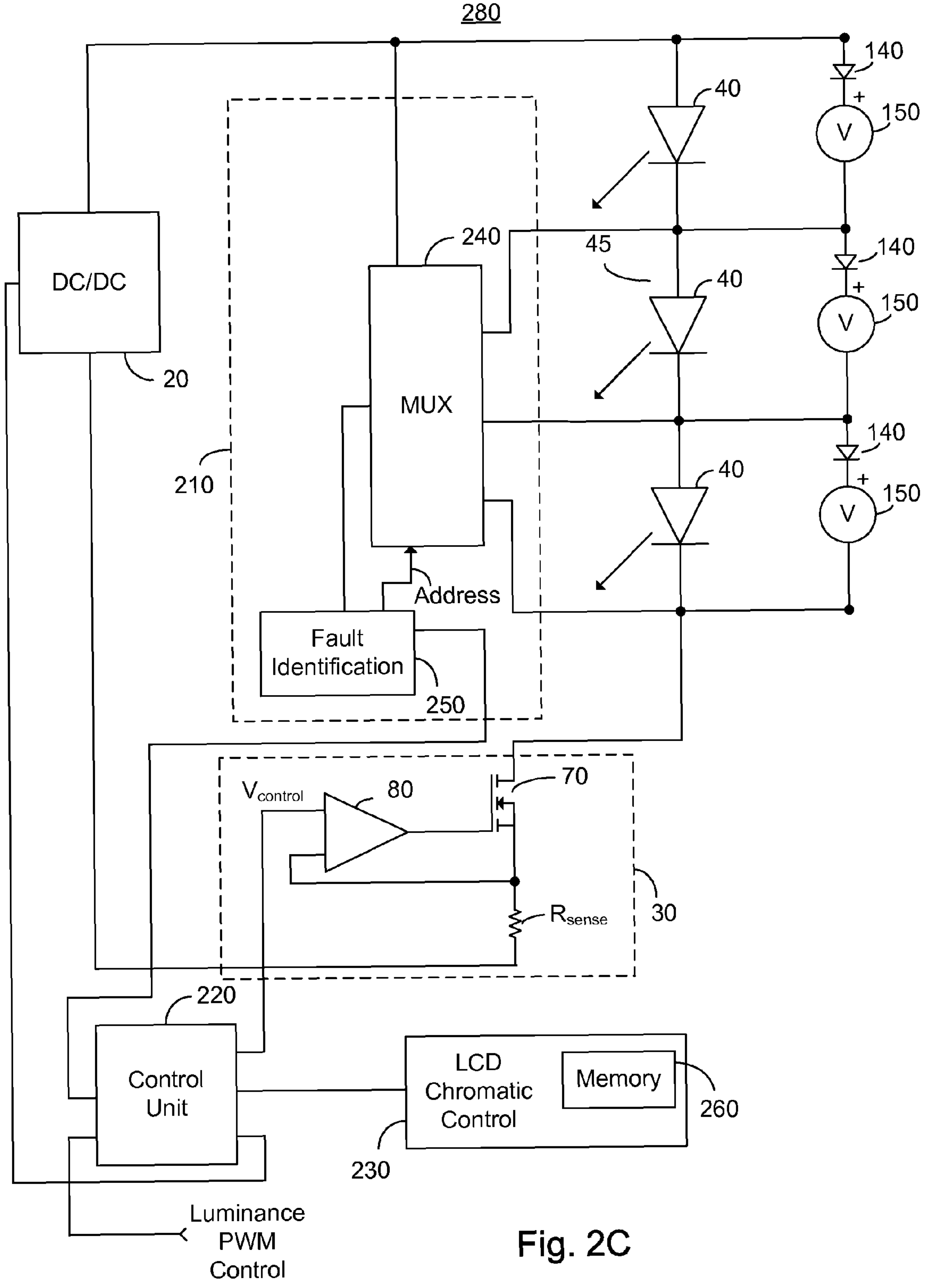
FIG. 2C illustrates a high level schematic diagram of a third embodiment of a passive element arranged to bypass an open LED in an LED string in accordance with a principle of the invention, in which a fault detection and identification mechanism is provided to detect the presence and identity of an open or shorted LED in the LED string.

FIG. 2C illustrates a high level schematic diagram of a third embodiment 280 of a passive element arranged to bypass an open LED in an LED string in accordance with a principle of the invention, in which a fault detection and identification mechanism is provided to detect the presence and identity of an open or short LED in the LED string.

Embodiment 280 comprises a DC/DC converter 20; a constant current control 30; a fault detection and identification mechanism 210; a plurality of LEDs 40 connected serially to form an LED string 45; a plurality of serially connected diodes 140 and voltage sources 150; a control unit 220; and an LCD chromatic control unit 230. LCD chromatic control unit 230 exhibits a memory 260. Constant current control 30 comprises a FET 70, a comparator and FET driver 80, and a sense resistor $R_{sense}$. Fault detection and identification mechanism 210 comprises a multiplexer 240 and a fault detection and control mechanism 250. FET 70 is illustrated as an N Channel MOSFET, however this is not meant to be limiting in any way, and FET 70 may be replaced with a P channel MOSFET, a bipolar transistor, or any other electronically controlled switch without exceeding the scope of the invention. FET 70 is advantageously shown as integrated within constant current control and fault identification unit 210, which is preferably supplied as an ASIC, however this is not meant to be limiting in any way. FET 70 may be supplied externally without exceeding the scope of the invention. Constant current control 30 and fault detection and identification mechanism 210 may be supplied as part of a single ASIC.

A serially connected diode 140 and voltage source 150 is connected in parallel with each LED 40 of LED string 45 and arranged to conduct only in the event that the voltage drop across the respective LED 40 is greater than the forward voltage drop of diode 140 and the voltage presented by voltage source 150. The positive output of DC/DC converter 20 is connected to the anode of the first LED 40 of LED string 45 and the positive end of the serially connected diode 140 and voltage source 150 which is connected in parallel to the first LED 40 of LED string 45. The cathode of the last LED 40 of LED string 45 is connected to the drain of FET 70, and the source of FET 70 is connected through sense resistor $R_{sense}$ to the return of DC/DC converter 20. One input of comparator and FET driver 80 is connected to the source of FET 70 and the other input is connected to a voltage controlled reference $V_{control}$ supplied by control unit 220. A further output of control unit 220 is connected to LCD chromatic control unit 230. Control unit 220 further receives an input from a luminance PWM control. The output of comparator and FET driver 80 is connected to the gate of FET 70 and DC/DC converter 20 is further connected to an output of control unit 220. The output of fault detection and control mechanism 250 is connected to control unit 220, an address control output of fault detection and control mechanism 250 is connected to multiplexer 240, and the output of multiplexer 240 is connected to the sensing input of fault detection and control mechanism 250. Multiplexer 240 exhibits a connection across each LED 40 of LED string 45.

In operation, comparator and FET driver 80 is connected to receive a voltage value reflective of the current flowing through the combination of LED string 45 and the parallel connected serially connected diodes 140 and voltage sources 150 as sensed by the voltage drop across sense resistor $R_{sense}$, and compare the voltage drop to control voltage $V_{control}$ supplied by control unit 220. $V_{control}$ determines the amount of current flowing through the combination of LED string 45 and the parallel connected serially connected diode 140 and voltage source 150 and is preferably pulsed, responsive to the luminance PWM control input, via an enable connection (not shown). In the event any of the plurality of LED 40 exhibiting an open condition, the voltage drop across the open LED 40 rises until conduction is enabled through the associated serially connected diode 140 and voltage source 150. The value of voltage source 150 is selected so that when the associated LED 40 is conducting, no appreciable current is carried by serially connected diode 140 and voltage source 150. In one non-limiting example in which the forward voltage drop across LED 40 in operation is 3.4 volts, and the forward voltage drop of diode 140 if 0.7 volts, voltage source 150 is set at a minimum of 3.1 volts and preferably at 3.3 volts. Thus, in the event of an open condition in any LED 40, current will bypass the open LED 40 and automatically flow through the associated serially connected diode 140 and voltage source 150. Further preferably, the voltage drop present across diode 140 and voltage source 150 is set so that no current flows through diode 140 and voltage source 150 during the normal range of operation of the associated LED 40, and is further set high enough so that fault detection and control mechanism 250 is able to identify the voltage change and thus identify the failed LED 40. Preferably, the voltage of voltage source 150 is minimized with the above criteria in mind so as to minimize power dissipation across diode 140 and voltage source 150.

Fault detection and control mechanism 250 operates multiplexer 240 to connect a voltage sensing input of fault detection and control mechanism 250 periodically in turn across each LED 40 of LED string 45. Fault detection and control mechanism 250 is operable to determine, based on the input voltage representation, a status of each LED 40 of LED string 45. In particular, in the event that the voltage representation at the input to fault detection and control mechanism 250 for each LED 40 is within the range representative of the nominal voltage drop across LED 40, fault detection and control mechanism 250 outputs an indication to control unit 220 that all LEDs 40 are in operation. Preferably, fault detection and control mechanism 250 further outputs data regarding the measured voltage drop. Fault detection and control mechanism 250 compares the current value of the voltage drop across each LED 40 with at least one previous value of the voltage drop across the respective LED 40. Fault detection and control mechanism 250 comprises a comparison functionality operable to detect changes in value above a certain threshold indicative of an open or short circuit condition for each LED 40 in LED string 45. Preferably, periodic measurement and comparison is accomplished between values relatively close in time, and thus changes in voltage drop due to aging and temperature are not detected as a failure.

In the event that a particular LED 40 exhibits an open condition, the voltage drop across the open LED 40 rises by the difference between the nominal operating forward voltage drop of the LED 40 previously measured and the operating forward voltage drop of a single diode 140 and voltage source 150. This increase in voltage drop is presented, via multiplexer 240, at the input to fault detection and control mechanism 250, which responsive to the sensed increased voltage drop outputs an indication and identification of a single failed open LED 40 to control unit 220.

In the event that a particular LED 40 of LED string 45 presents a short circuit failure, the voltage drop across the short LED 40 falls to zero from the previous operating forward voltage drop of the LED 40. This decrease in voltage drop is represented via multiplexer 240 at the input to fault detection and control mechanism 250, which responsive to the sensed decreased voltage drop outputs an indication and identification of the failed shorted LED 40 to control unit 220.

The voltage drop across each LED 40 is thus directly sensed, and an indication of the status is generated for each LED 40 and communicated to control unit 220. In an exemplary embodiment fault detection and identification mechanism receives a timing indication from the DC/DC control PWM circuit (not shown), and thus measures the voltage drop during the time of operation of LED 40. Preferably, fault detection and control mechanism 250 measures the voltage drop across each LED 40 of LED string 45 in a periodic round robin, thus receiving an indication of operation for each LED 40 in turn.

Fault detection and control mechanism 250 is preferably further operative to indicate the voltage drop across each LED 40 to control unit 220, as described above, so as to identify early aging of LED 40. Control unit 220, responsive to the voltage drop indication regarding each LED 40, is operative to identify a low output LED 40. Control unit 220 is further operative to transmit the identity of a low output LED 40 and/or the identity of a failed identified LED responsive to an indication and identification from fault detection and control mechanism 250 to LCD chromatic control unit 230. In an exemplary embodiment a low output LED 40 is identified by comparing the sensed voltage to a pre-stored table indicative of expected voltage values for each expected condition of the LEDs 40. In one embodiment the pre-stored table includes an offset for age and temperature, the age being continuously stored and updated as a running total based on the operation of LED string 45.

LCD chromatic control unit 230 operates, as will be described further hereinto below, to modify the chromatic response of the LCD matrix to at least partially compensate for the identified failed LED 40. Preferably, the chromatic response of the LCD matrix driver is modified in accordance with a table stored in memory 260, as will be described hereinto below in relation to FIGS. 4A-4B. LCD chromatic control 230 may further operate to communicate with control unit 220 so as to reduce or increase the output of the remaining active LEDs 40 via the operation of DC/DC converter 20, and adjust $V_{control}$ to increase or reduce the output of other LED strings 45 so as to more completely at least partially compensate for the failed LED 40. DC/DC converter 20 is responsive to an output of control unit 220 so at match its output voltage to the voltage drop required across the combination of LED string 45 and diode 140 and voltage source 150 thereby minimizing power loss.

Advantageously, LED string 45 continues to conduct and output light from the remaining operating LEDs 40 in LED string 45. Disadvantageously, the current through the conducting diode 140 and voltage source 150 is dissipated as heat.

Figure 3:
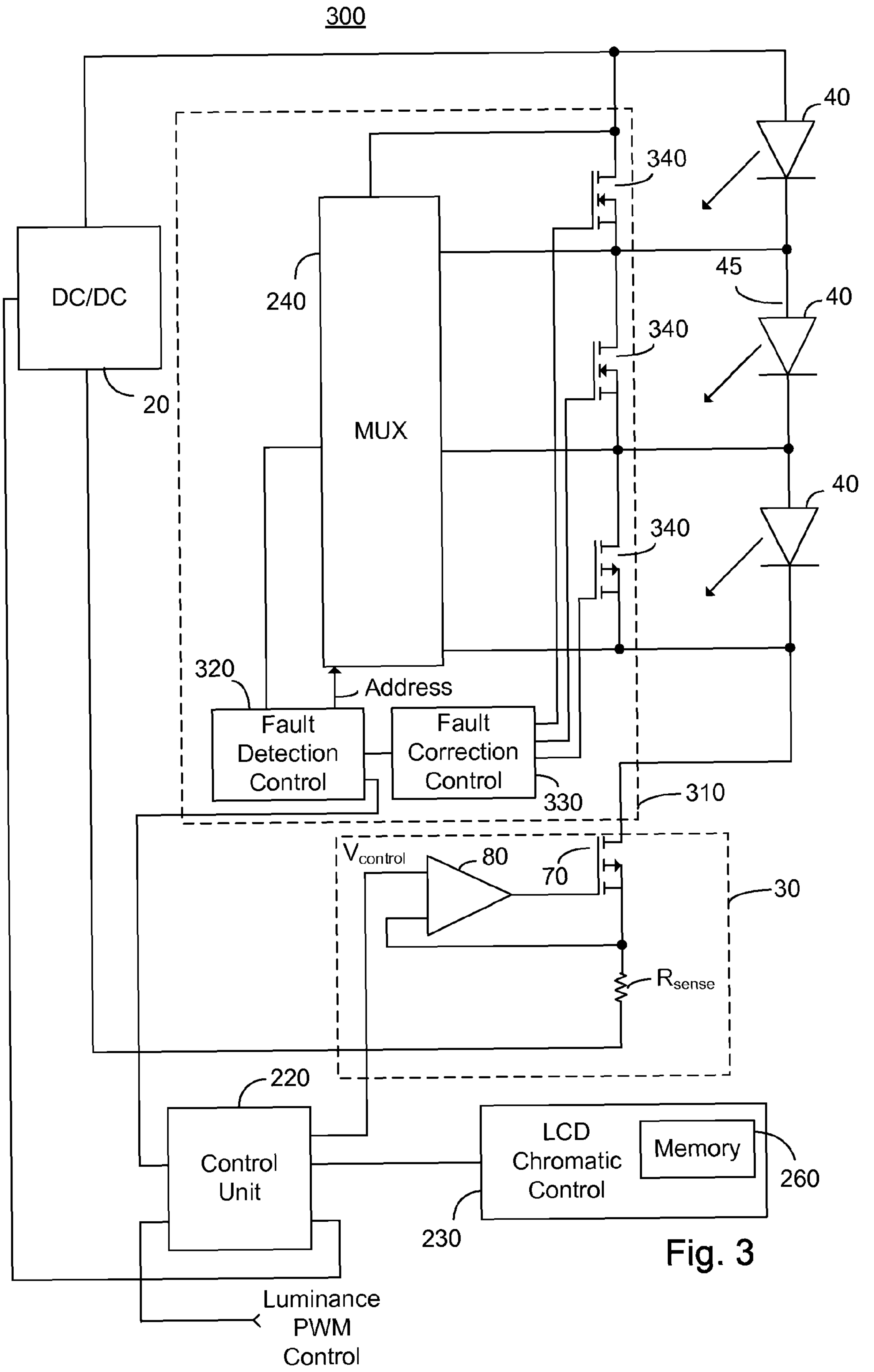
FIG. 3 illustrates a high level schematic diagram of an embodiment in accordance with a principle of the invention in which for each LED in the LED string an electronically controlled switch is provided arranged to bypass a LED in the event that the LED exhibits an open condition, and in which a fault detection and identification mechanism is provided to detect the presence and identity of an open or shorted LED in the LED string.

FIG. 3 illustrates a high level schematic diagram of an embodiment 300 in accordance with a principle of the invention in which for each LED in the LED string an electronically controlled switch is provided arranged to bypass a LED in the event that the LED exhibits an open condition, and in which a fault detection and identification mechanism is provided to detect the presence and identity of an open or shorted LED in the LED string.

Embodiment 300 comprises: a DC/DC converter 20; a constant current control 30; a fault identification and correction mechanism 310; a plurality of LEDs 40 connected serially to form an LED string 45; a control unit 220; and an LCD chromatic control unit 230. LCD chromatic control unit 230 exhibits a memory 260. Constant current control 30 comprises a FET 70, a comparator and FET driver 80, and a sense resistor $R_{sense}$. Fault identification and correction mechanism 310 comprises a multiplexer 240, a fault detection, identification and control mechanism 320, a fault correction control 330 and a plurality of electronically controlled switches 340 illustrated as FETs. FET 70 is illustrated as an N Channel MOSFET, however this is not meant to be limiting in any way, and FET 70 may be replaced with a P channel MOSFET, a bipolar transistor, or any other electronically controlled switch without exceeding the scope of the invention. FET 70 is advantageously shown as integrated within constant current control 30, which is preferably supplied as an ASIC, however this is not meant to be limiting in any way. FET 70 may be supplied externally without exceeding the scope of the invention. Constant current control 30 and fault identification and correction mechanism 310 may be supplied as part of a single ASIC.

The positive output of DC/DC converter 20 is connected to the anode of the first LED 40 of LED string 45. The cathode of the last LED 40 of LED string 45 is connected to the drain of FET 70, and the source of FET 70 is connected through sense resistor $R_{sense}$ to the return of DC/DC converter 20. One input of comparator and FET driver 80 is connected to the source of FET 70 and the other input is connected to a voltage controlled reference $V_{control}$ supplied by control unit 220. A further output of control unit 220 is connected to LCD chromatic control unit 230. Control unit 220 further receives an input from a luminance PWM control. The output of comparator and FET driver 80 is connected to the gate of FET 70 and DC/DC converter 20 is further connected to an output of control unit 220.

The output of fault detection, identification and control mechanism 320 is connected to control unit 220, an address control output of fault detection, identification and control mechanism 320 is connected to multiplexer 240, a further output of fault detection, identification and control mechanism 320 is connected to the input of fault correction control 330 and the output of multiplexer 240 is connected to the sensing input of fault detection, identification and control mechanism 320. Multiplexer 240 exhibits a connection across each LED 40 of LED string 45. Each of the plurality of FETs 340 are connected across a unique one of LEDs 40 of LED string 45, and the gate of each FET 340 is connected to an output of fault correction control 330.

In operation, comparator and FET driver 80 is connected to receive a voltage value reflective of the current flowing through LED string 45 as sensed by the voltage drop across sense resistor $R_{sense}$, and compare the voltage drop to control voltage $V_{control}$ supplied by control unit 220. $V_{control}$ determines the amount of current flowing through LED string 45 and can thus provide a constant current source, and is preferably pulsed, responsive to the luminance PWM control input, via an enable connection (not shown).

Fault detection, identification and control mechanism 320 operates multiplexer 240 to connect a voltage sensing input of fault detection, identification and control mechanism 320 periodically in turn across each LED 40 of LED string 45. Fault detection, identification and control mechanism 320 is operable to determine, based on the input voltage representation, a status of each LED 40 of LED string 45. In particular, in the event that the voltage representation at the input to fault detection, identification and control mechanism 320 for each LED 40 is within the range representative of the nominal voltage drop across LED 40, fault detection, identification and control mechanism 320 outputs an indication to control unit 220 that all LEDs 40 are in operation. Preferably, fault detection, identification and control mechanism 320 further outputs data regarding the measured voltage drop. Fault detection, identification and control mechanism 320 compares the current value of the voltage drop across each LED 40 with at least one previous value of the voltage drop across the respective LED 40. Fault detection, identification and control mechanism 250 comprises a comparison functionality operable to detect changes in value above a certain threshold indicative of an open or short circuit condition for each LED 40 in LED string 45. Preferably, periodic measurement and comparison is accomplished between values relatively close in time, and thus changes in voltage drop due to aging and temperature are not detected as a failure.

In the event that a particular LED 40 exhibits an open condition, the voltage drop across the open LED 40 rises to a level representative of the voltage output of DC/DC converter 20 under a nearly no load condition less the voltage drop of the LEDs 40 between the open LED 40 and DC/DC converter 20, responsive to a small current flow due to multiplexer 240. This increase in voltage drop is presented, via multiplexer 240, at the input to fault detection, identification and control mechanism 320, which responsive to the sensed increased voltage drop outputs an indication and identification of a single failed open LED 40 to control unit 220.

In the event that a particular LED 40 of LED string 45 presents a short circuit failure, the voltage drop across the short LED 40 falls to zero from the previous operating forward voltage drop of the LED 40. This decrease in voltage drop is represented via multiplexer 240 at the input to fault detection, identification and control mechanism 320, which responsive to the sensed decreased voltage drop outputs an indication and identification of the failed shorted LED 40 to control unit 220.

The voltage drop across each LED 40 is thus directly sensed, and an indication of the status is generated for each LED 40 and communicated to control unit 220. In an exemplary embodiment fault detection, identification and control mechanism 320 receives a timing indication from the DC/DC control PWM circuit (not shown), and thus measures the voltage drop during the time of operation of LED 40. Preferably, fault detection, identification and control mechanism 320 measures the voltage drop across each LED 40 of LED string 45 in a periodic round robin, thus receiving an indication of operation for each LED 40 in turn.

Fault detection, identification and control mechanism 320 is further operative in the event of a sensed open LED 40 to transmit a control signal to fault correction control 330 indicative of the open LED 40. Fault correction control 330 is operative responsive to the received control signal, to operate the respective FET 340 connected across the open LED 40 to create a conduction path around the open LED 40. Advantageously, as a result, all other LEDs 40 in LED string 45 remain operational despite the existence of the open LED 40. Further advantageously, FET 340 exhibits a very low voltage drop when conducting and thus minimal power is dissipated as heat.

Fault detection, identification and control mechanism 320 is preferably further operative to indicate the voltage drop across each LED 40 to control unit 220, as described above, so as to identify early aging of LED 40. Control unit 220, responsive to the voltage drop indication regarding each LED 40, is operative to identify a low output LED 40. Control unit 220 is further operative to transmit the identity of a low output LED 40 and/or the identity of a failed identified LED responsive to an indication and identification from fault detection, identification and control mechanism 250 to LCD chromatic control unit 230. In an exemplary embodiment a low output LED 40 is identified by comparing the sensed voltage to a pre-stored table indicative of expected voltage values for each expected condition of the LEDs 40. In one embodiment the pre-stored table includes an offset for age and temperature, the age being continuously stored and updated as a running total based on the operation of LED string 45.

LCD chromatic control unit 230 operates, as will be described further hereinto below, to modify the chromatic response of the LCD matrix driver to at least partially compensate for the identified failed LED 40. Preferably, the chromatic response of the LCD matrix driver is modified in accordance with a table stored in memory 260 as will be described further hereinto below. LCD chromatic control 230 may further operate to communicate with control unit 220 so as to reduce or increase the output of the remaining active LEDs 40 via the operation of DC/DC converter 20, and adjust $V_{control}$ to increase or reduce the output of other LED strings 45 so as to more completely at least partially compensate for the failed LED 40. DC/DC converter 20 is responsive to an output of control unit 220 so at match its output voltage to the voltage drop required across the LED string 45.

In another embodiment, additional LEDs 40 are disabled such as by the operation of an associated FET 340, and the PWM duty cycle of the LED string 45 is increased via PWM luminance control or the operation of control unit 220 so as to increase the light output in a balanced manner across LED string 45 thereby at least partially compensating for the failed LED 40. Preferably, a diffuser associated with LED string 45 is designed to average the light output from adjacent LEDs 40. Thus, a single failed LED 40 of a single color may be compensated by an increased output of the remaining LEDs 40 of the string, and by optionally disabling one or more additionally LED 40 of the string to create an average light which returns the original white point.

The above has been described in relation to a single failure, however this is not meant to be limiting in any way. Multiple failures of LEDs 40, and any combination of short circuits and open circuits can be similarly ascertained, identified and reported without exceeding the scope of the invention. Advantageously, LED string 45 continues to conduct and output light from the remaining operating LEDs 40 in LED string 45.

Figure 4A:
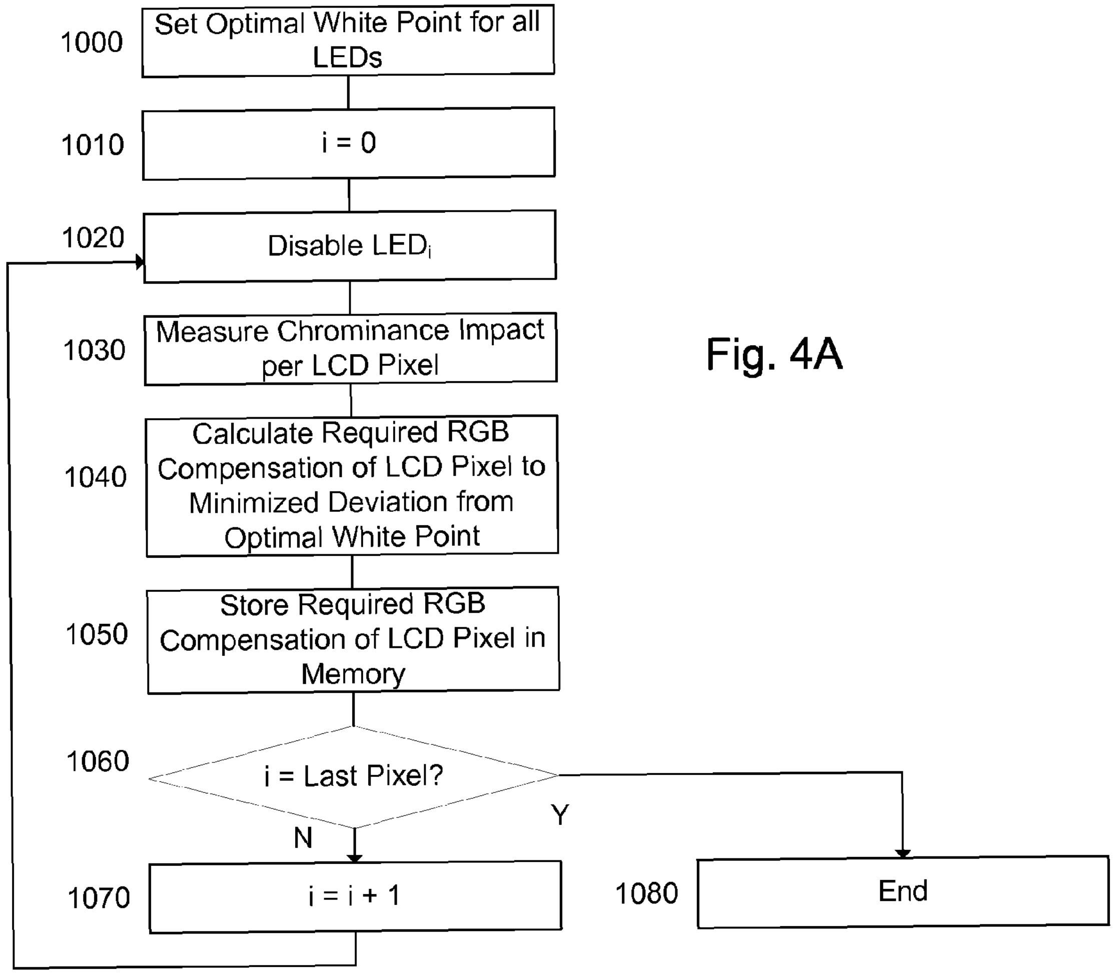
FIG. 4A illustrates a high level flow chart of a calibration routine to determine the appropriate LCD chromatic control compensation for each failed LED in accordance with a principle of the invention.

FIG. 4A illustrates a high level flow chart of a calibration routine to determine the appropriate LCD chromatic control compensation for each failed LED in accordance with a principle of the invention.

In stage 1000, an optimal white point is set for all LED in the LCD monitor as is known to the prior art. In stage 1010, an index, i, for all LEDs in the LCD monitor is initialized and set to the first LED. In stage 1020 $LED_i$, is disabled. In an embodiment such as embodiment 300 of FIG. 3 this may be accomplished by closing the appropriate FET 340 via a calibration control input.

In stage 1030, the chrominance impact per pixel of the monitor is measured as a result of the disabling of $LED_i$. In one embodiment the impact for each pixel of the LCD monitor is measured, and in another embodiment only pixels which are appreciably optically impacted by $LED_i$ are measured.

In stage 1040, the required compensation for each LCD pixel is calculated. Preferably, the compensation is selected to minimize the change from optimal white point. In an embodiment in which white LEDs are utilized, preferably the compensation is selected to minimize any brightness variance across the monitor. In one embodiment, control over luminance via the luminance control PWM is further available, and thus luminance of one or more LED strings may be modified to further adjust the white point. Any change in luminance control PWM from the pre-set white point is monitored to be utilized as will be described further hereinto below to optimize compensation for a failed LED.

In one non-limiting example in which the LEDs comprise color LEDs and in which a single colored LED 40 has failed, the luminance of at least the remaining LEDs of the same color and of the same string as the failed LED is increased. Pixels formerly lit by the failed LED, thus receive a luminance of the same color from adjacent LEDs. The increased luminance of the color of the failed LED is compensated by increased activity of the LCD filter of the matrix associated with the color of the failed LED.

In stage 1050, the required compensation for each LCD pixel, and optionally the luminance control PWM change, calculated in stage 1020 is stored associated with the identification of the $LED_i$. In an exemplary embodiment the compensation is stored in memory 260 of FIGS. 2A-2C, 3 and preferably stored in a table format. Thus, for $LED_i$, optimal compensation via luminance control PWM and LCD chromatic compensation via LCD pixel compensation is pre-determined and stored associated with $LED_i$.

In stage 1060, LED index i is compared with a last LED indicator. In the event the LED index i is not the last LED, in stage 1070 index i is increase by 1, and stage 1020 is performed. In the event that in stage 1060 the LED index i is the last LED, in stage 1080 the routine ends having stored optimal compensation information for each LED in the LCD monitor.

Figure 4B:
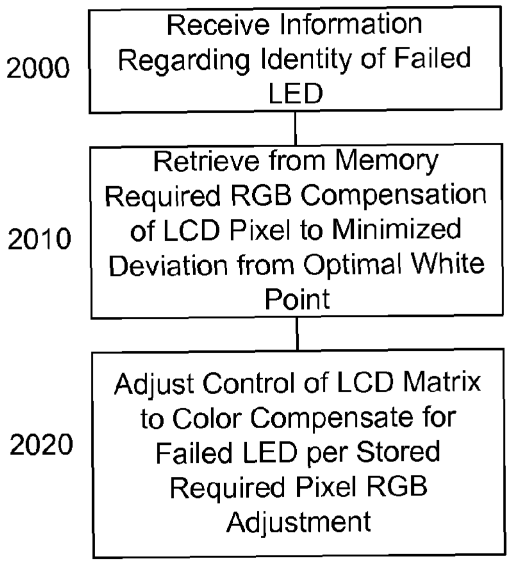
FIG. 4B illustrates a high level flow chart of the operation of a chromatic control compensation function associated with a transmissive portion of an LCD monitor to compensate for an identified open or shorted LED in accordance with a principle of the invention.

FIG. 4B illustrates a high level flow chart of the operation of a chromatic control associated with a transmissive portion of an LCD monitor to compensate for an identified open or shorted LED in accordance with a principle of the current invention.

In stage 2000, information is received at LCD chromatic control 230 identifying a failed LED. In the embodiment of system 300 of FIG. 3, this information is produced by fault detection, identification and control mechanism 320 and in embodiments 200, 270 and 280 of FIGS. 2A, 2B and 2C respectively, by fault detection and control mechanism 250.

In stage 2010, the required compensation stored in stage 1040 of FIG. 4A associated with the failed identified LED is retrieved. In stage 2020, control of the LCD matrix is adjusted to at least partially compensate for the failed LED in accordance with the required compensation retrieved in stage 2010. Additionally, and optionally, in the event control over luminance via the luminance control PWM is further stored, the luminance of one or more LED strings is modified to further adjust the white point.

Figure 5A:
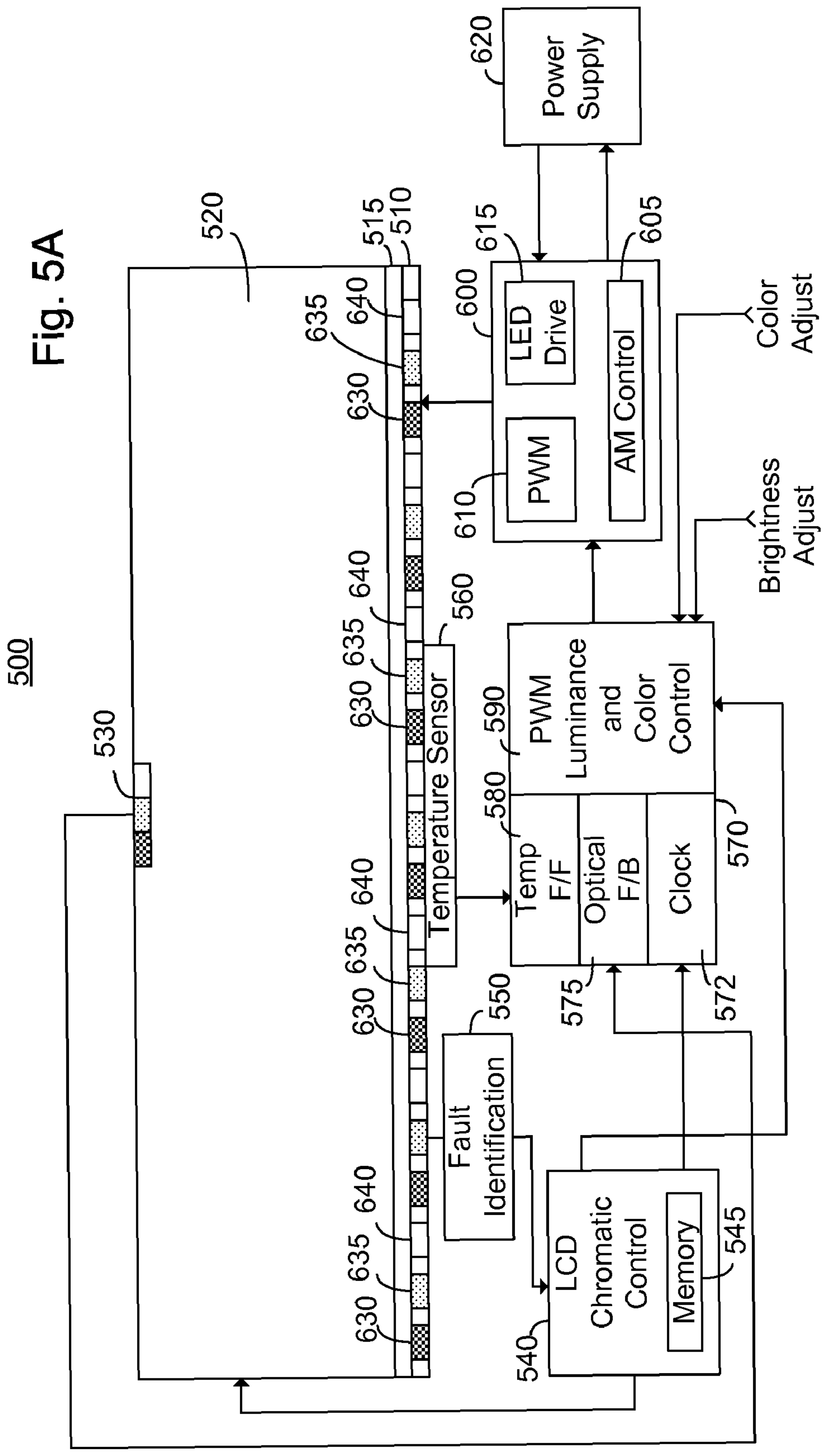
FIG. 5A illustrates a high level block diagram of an LCD monitor exhibiting colored LEDs and a single color sensor arranged to provide a feedback of required color correction in accordance with a principle of the invention.

FIG. 5A illustrates a high level block diagram of an LCD monitor 500 exhibiting colored LEDs and a single color sensor arranged to provide a feedback of required color correction. LCD monitor 500 comprises a plurality of LED strings 510 arranged along one edge, side, or back of LCD monitor 500; a diffuser 515; an LCD active matrix 520; a color sensor 530; an LCD chromatic control 540 having on board memory 545; a fault identification unit 550; a temperature sensor 560; an LCD backlight control unit 570 comprising an internal clock 572, an optical feedback unit 575, a temperature feed forward 580 and a PWM luminance and color control unit 590; a backlight driving unit 600 comprising amplitude modulation control 605, PWM control 610 and an LED driver 615; and a power supply 620. LED strings 510 comprise a plurality of first colored LEDs 630; a plurality of second color LEDs 635; and a plurality of third color LEDs 640. Diffuser 515 is placed so as to mix the colored output of first colored LEDs 630, second color LEDs 635 and third color LEDs 640 so as to produce a white back light for LCD active matrix 520.

LCD active matrix 520 is controlled by LCD chromatic control 540. LCD chromatic control 540 receives information regarding the identity of a failed LED from fault identification unit 550, and preferably functions based on information stored in memory 545 to compensate for a failed LED. Fault identification unit 550 is preferably connected to measure the voltage drop across each first colored LEDs 630; second color LEDs 635; and third color LEDs 640.

LCD chromatic control 540 provides a synchronizing signal for internal clock 572 and a control signal for PWM luminance and color control unit 590. Thus, in the event than compensation requires a change in PWM luminance or amplitude control luminance for any of the plurality of LED strings 510, PWM luminance and color control unit 590 is operative responsive to the control signal to affect the compensation. Additionally, PWM luminance and color control unit 590 is responsive to sleep mode and test mode instructions from LCD chromatic control 540. Temperature feed forward 580 receives an input from temperature sensor 560 and is operable to compensate for changes in luminance of each color due to temperature changes. Temperature feed forward 580 calculates the appropriate compensation for each color LED string 510, preferably via the use of an on-board look up table, and adjusts at least one of AM control 605 and PWM control 610.

Backlight driving unit 600 is connected to supply pulse width and amplitude modulated constant current drive for LEDs 630, 635 and 640 vi LED driver 615, and to receive power from power supply 620. Power supply 620 further receives control information from backlight driving unit 600.

Optical feedback 575 receives an input from color sensor 530 and is operable to respond to changes in both the luminance and white point. In one embodiment color sensor 530 comprises an XYZ sensor, whose output values closely track the tristimulus values of the human eye. In another embodiment an RGB sensor is used. Optical feedback 575 is operable to adjust at least one of AM control 650 and PWM control 610 to maintain a pre-determined white point.

In another embodiment, color sensor 530 is associated with a pre-determined location and is further used to adjust color feedback in the event of a failed LED. Thus, the change in color balance as a result of the failed LED is noted upon a fault output from fault identification 550, and the compensation stored in memory 545 is adjusted responsive to the input from color sensor 530. Additionally, aging of the LEDs is sensed and preferably compensated for by the feedback of color sensor 530.

PWM luminance and color control unit 590 further receives user input to adjust brightness and color, and is responsive to those inputs to modify at least one of AM control 605 and PWM control 610 of backlight driving unit 600

Backlight driving unit 600 receives a control input from PWM luminance and control unit 590 and is operative to drive the plurality of LED strings 510, via LED driver 615, responsive to the control input. Backlight driving unit 600 further receives power from power supply 620, which preferably supplies a separate constant current power for each color LED string of the plurality of LED strings 510. Power supply 620 is further operative responsive to backlight driving unit 600 to modify its output voltage.

Figure 5B:
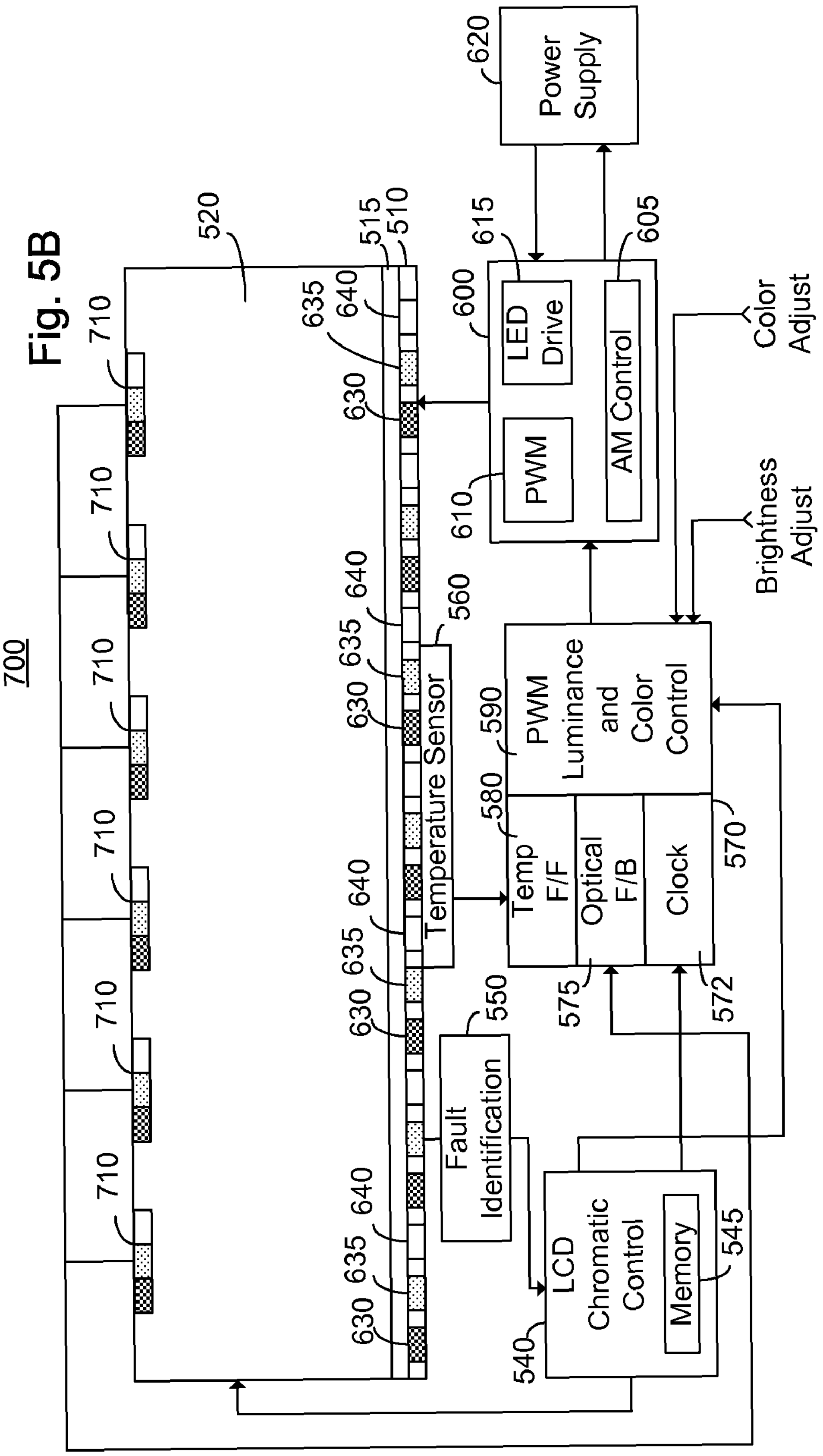
FIG. 5B illustrates a high level block diagram of an LCD monitor exhibiting colored LEDs and a plurality of regional sensors arranged to provide a feedback of required color correction in accordance with a principle of the invention.

FIG. 5B illustrates a high level block diagram of an LCD monitor 700 exhibiting colored LEDs and a plurality of color sensors arranged to provide a feedback of required color correction. LCD monitor 700 comprises a plurality of LED strings 510 arranged along one edge, side or back of LCD monitor 500; an LCD active matrix 520; a plurality of color sensors 710; an LCD chromatic control 540 having on board memory 545; a fault identification unit 550; a temperature sensor 560; an LCD backlight control unit 570 comprising an internal clock 572, an optical feedback unit 575, a temperature feed forward 580 and a PWM luminance and color control unit 590; a backlight driving unit 600 comprising amplitude modulation control 605, PWM control 610 and an LED driver 615; and a power supply 620. LED strings 510 comprise a plurality of first colored LEDs 630; a plurality of second color LEDs 635; and a plurality of third color LEDs 640. Diffuser 515 is placed so as to mix the colored output of first colored LEDs 630, second color LEDs 635 and third color LEDs 640 so as to produce a white back light for LCD active matrix 520.

LCD active matrix 520 is controlled by LCD chromatic control 540. LCD chromatic control 540 receives information regarding the identity of a failed LED from fault identification unit 550, and preferably functions based on information stored in memory 545 to compensate for a failed LED. Fault identification unit 550 is preferably connected to measure the voltage drop across each first colored LEDs 630; second color LEDs 635; and third color LEDs 640.

LCD chromatic control 540 provides a synchronizing signal for internal clock 572 and a control signal for PWM luminance and color control unit 590. Thus, in the event than compensation requires a change in PWM luminance or amplitude control luminance for any of the plurality of LED strings 510, PWM luminance and color control unit 590 is operative responsive to the control signal to affect the compensation. Additionally, PWM luminance and color control unit 590 is responsive to sleep mode and test mode instructions from LCD chromatic control 540. Temperature feed forward 580 receives an input from temperature sensor 560 and is operable to compensate for changes in luminance of each color due to temperature changes. Temperature feed forward 580 calculates the appropriate compensation for each color LED string 510, preferably via the use of an on-board look up table, and adjusts at least one of AM control 605 and PWM control 610.

Backlight control unit 600 is connected to supply pulse width and amplitude modulated constant current drive for LEDs 630, 635 and 640 via LED driver 615, and to receive power from power supply 620. Power supply 620 further receives control information from backlight control unit 600.

Optical feedback 575 receives an input from the plurality of color sensors 710 and is operable to respond to changes in both the luminance and white point. In one embodiment each color sensor 710 comprises an XYZ sensor, whose output values closely track the tristimulus values of the human eye. In another embodiment an RGB sensor is used. Optical feedback 575 is operable to adjust at least one of AM control 650 and PWM control 610 to maintain a pre-determined white point.

In another embodiment, each of the plurality of color sensors 710 are associated with a pre-determined location and are further used to adjust color feedback in the event of a failed LED. Thus, the change in color balance as a result of the failed LED is noted upon a fault output from fault identification 550, and the compensation stored in memory 545 is adjusted responsive to the input from color sensor 710. In particular, the color sensors 710 in line or nearly in line with the failed LED detected an identified by fault identification unit 550 are used to fine tune any proper color balance by LCD chromatic control 540. In one embodiment, no predetermined compensation is stored, and the plurality of color sensor 710 are used to reset the white point across LCD matrix 520. Additionally, aging of the LEDs is sensed and preferably compensated for by the feedback of the plurality of color sensors 710.

PWM luminance and color control unit 590 further receives user input to adjust brightness and color, and is responsive to those inputs to modify at least one of AM control 605 and PWM control 610 of backlight driving unit 600.

Backlight driving unit 600 receives a control input from PWM luminance and control unit 590 and is operative to drive the plurality of LED strings 510 via backlight driver 615 responsive to the control input. Backlight driving unit 600 further receives power from power supply 620, which preferably supplies a separate constant current power for each color LED string of the plurality of LED strings 510. Power supply 620 is further operative responsive to backlight driving unit 600 to modify its output voltage.

Figure 6A:
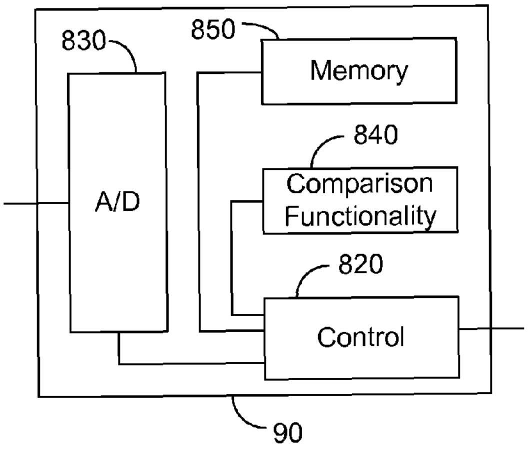
FIG. 6A illustrate a high level block diagram of a fault detection mechanism in accordance with a principle of the current invention.

FIG. 6A illustrate a high level block diagram of a fault detection mechanism 90 in accordance with a principle of the current invention, comprising a control circuitry 820, an A/D converter 830, a comparison functionality 840 and a memory 850. Control circuitry 820 is connected to each of comparison functionality 840, memory 850 and A/D converter 830.

In operation, control circuitry 820 periodically operates A/D converter 830 to sample a representation of the voltage present at the input to A/D converter 830. A/D converter 830 is operable to output a digital representation of the voltage measurement at its input. Control circuitry 820 is further operable to store the digital representation received from A/D converter 830 on memory 850 and to compare, utilizing comparison functionality 840, the digital representation received from A/D converter 830 with a previous digital representation received from A/D converter 830 stored on memory 850.

A/D converter 830 in cooperation with the voltage divider comprising $R_1$, $R_2$ of FIGS. 1A-1C, represents a particular implementation of a voltage measuring means, however this is not meant to be limiting in any way. In another embodiment, analog circuitry is utilized in place of A/D converter 830 and comparison functionality 840 to directly detect a voltage change greater than a predetermined amount without exceeding the scope of the invention. Memory 850 may comprise any of a shift register, a random access memory and a flash memory, without limitation.

In the event that the comparison is indicative of one of a short circuit LED and an open circuit LED, control circuitry 820 is further operable output a fault indicator. As described above, preferably the comparison and is between consecutive outputs of A/D converter 830.

Figure 6B:
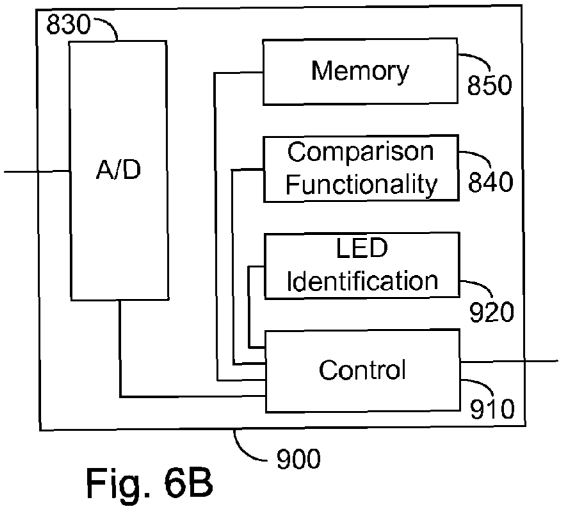
FIG. 6B illustrate a high level block diagram of a fault detection and control mechanism in accordance with a principle of the current invention.

FIG. 6B illustrate a high level block diagram of a fault detection and control mechanism 900 in accordance with a principle of the current invention, comprising a control circuitry 910, an A/D converter 830, a comparison functionality 840, a memory 850 and an LED identification functionality 920. Control circuitry 910 is connected to each of comparison functionality 840, memory 850, A/D converter 830 and identification functionality 920.

In operation, control circuitry 910 operates LED identification functionality 920 to index the address of multiplexer 240, as shown in FIG. 2A-2C, to connect the input of A/D converter 830 across each of the LEDs 40. Control circuitry 910 further periodically operates A/D converter 830 to sample the voltage at the inputs to A/D converter 830. A/D converter 830 is operable to output a digital representation of the voltage sampled at its input. Control circuitry 910 is further operable to store the digital representation received from A/D converter 830 on memory 850 of the respective LED 40 and to compare, utilizing comparison functionality 840, the digital representation received from A/D converter 830 with a previous digital representation received from A/D converter 830 stored on memory 850 for the respective LED 40.

A/D converter 830 may be utilized in cooperation with a voltage divider (not shown), and represents a particular implementation of a voltage measuring means, however this is not meant to be limiting in any way. In another embodiment, analog circuitry is utilized in place of A/D converter 830 and comparison functionality 840 to directly detect a voltage change greater than a predetermined amount without exceeding the scope of the invention. Memory 850 may comprise any of a shift register, a random access memory and a flash memory, without limitation.

In the event that the comparison is indicative of one of a short circuit LED and an open circuit LED, control circuitry 910 is further operable to output a fault indicator, to read from LED identification functionality 920 the identity of the short circuit or open circuit LED 40, and to output the read identity. As described above, preferably the comparison for each LED 40 is between consecutive outputs of A/D converter 830.

Fault identification and detection mechanism 900 is in all respects identical with fault detection and control mechanism 250 of FIGS. 2A-2C. Fault identification and detection mechanism 900 is further configurable to operate as fault detection, identification and control mechanism 320 of FIG. 3 by an additional output (not shown) from control circuitry

910 arranged to output the address received from LED identification functionality 920 of a detected open LED 40 to fault correction control 330.

Figure 7A:
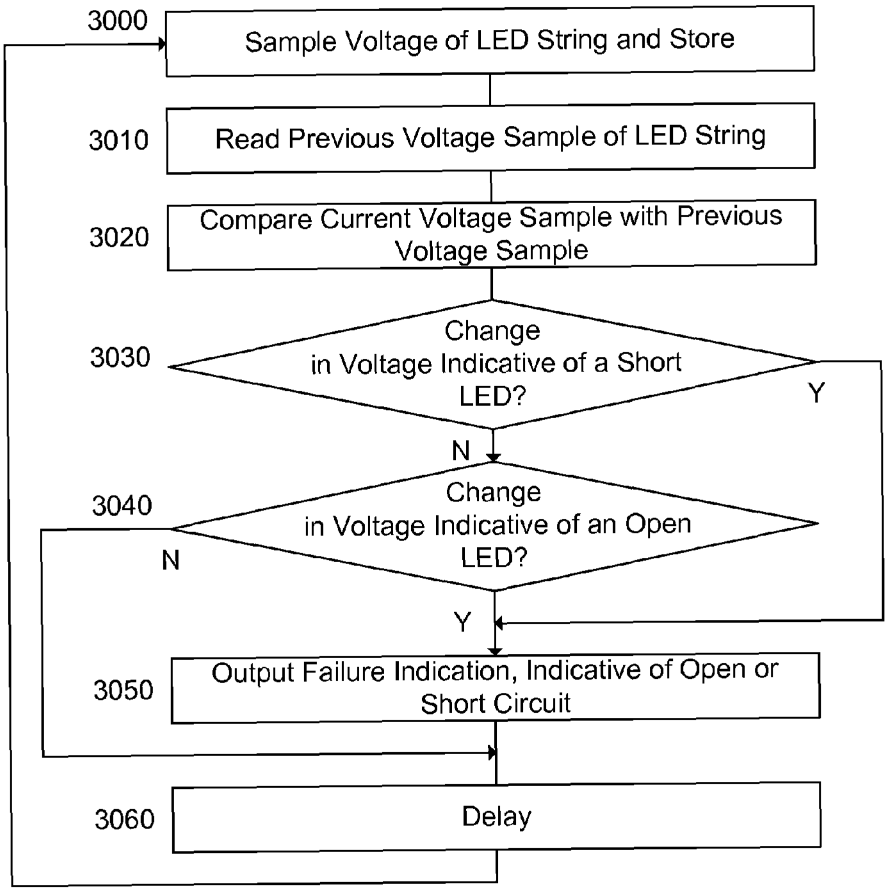
FIG. 7A illustrate a high level flow chart of the operation of the fault detection mechanism of FIG. 6A to detect one of a short circuit LED and an open circuit LED in accordance with a principle of the current invention.

FIG. 7A illustrate a high level flow chart of the operation of fault detection mechanism 90 of FIG. 6A to detect one of a short circuit LED and an open circuit LED in accordance with a principle of the current invention. In stage 3000, control circuitry 820 samples the voltage of LED string 45 and stores a representation of the voltage drop across LED string 45 on memory 850. In stage 3010, control circuitry 820 reads the previous voltage sample stored on memory 850.

In stage 3020, control circuitry 820 in cooperation with comparison functionality 840 compares the current voltage sample input in stage 3000 with the previous voltage sample read in stage 3010. In stage 3030, the comparison is reviewed to determine if it is indicative of a short circuit LED 40 in LED string 45. In particular, a short circuit LED 40 is characterized by a sudden decrease in the voltage drop across LED string 45 exhibiting a difference on the order of a forward voltage drop of LED 40. In the event that in stage 3030 the change is indicative of a short circuit LED 40 in LED string 45, in stage 3050 control circuitry 820 outputs a failure indication, preferably including a notification that the failure indication is associated with a short circuit LED 40. In stage 3060, a delay is inserted. Preferably the delay ensures that sampling by A/D converter 830 is synchronized with the PWM control. Stage 3000 as described above is then performed.

In the event that in stage 3030 the change is not indicative of a short circuit in LED string 45, in stage 3040 the comparison of stage 3020 is reviewed to determine if it is indicative of an open circuit LED 40 in LED string 45. In the event that the change is indicative of an open circuit LED 40 in LED string 45, in stage 3050 control circuitry 820 outputs a failure indication, preferably including a notification that the failure indication is associated with an open circuit LED 40.

In the event that in stage 3040 the change is not indicative of an open circuit LED 40 in LED string 45, stage 3060 as described above is performed.

Thus, the method of FIG. 7A is operative to periodically compare the voltage drop across LED string 45 with a previous measurement of the voltage drop across LED string 45. Responsive to the comparison, control circuitry 820 identifies an open circuit LED 40 and a short circuit LED 40 and outputs a failure indication accordingly.

Figure 7B:
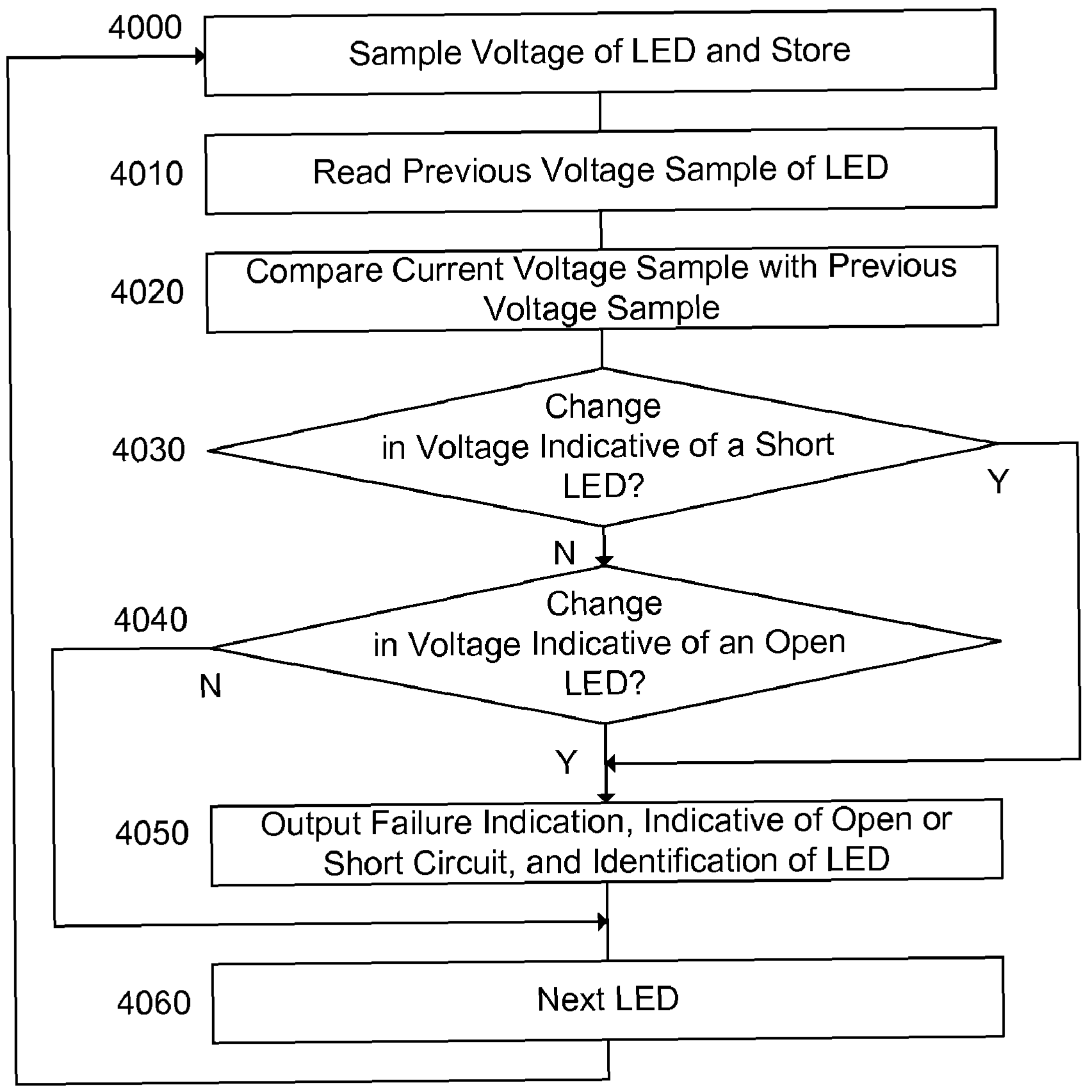
FIG. 7B illustrates a high level flow chart of the operation of the fault detection and control mechanism of FIG. 6B to detect and identify one of a short circuit LED and an open circuit LED in accordance with a principle of the current invention.

FIG. 7B illustrates a high level flow chart of the operation of fault detection and control mechanism 900 of FIG. 6B to detect and identify one of a short circuit LED and an open circuit LED in accordance with a principle of the current invention. In stage 4000, control circuitry 910 samples the voltage of LED 40, addressed by LED identification functionality 920, and stores a representation of the voltage drop across LED 40 on memory 850 associated with an identifier of LED 40. Preferably the sampling of stage 4000 is synchronized with the PWM control. In stage 4010, control circuitry 910 reads the previous voltage sample for the identified LED 40 stored on memory 850.

In stage 4020, control circuitry 910 in cooperation with comparison functionality 840 compares the current voltage sample input in stage 4000 with the previous voltage sample read in stage 4010. In stage 3030, the comparison is reviewed to determine if it is indicative of a short circuit LED 40. In particular, a short circuit LED 40 is characterized by a sudden decrease in the voltage drop exhibiting a difference on the order of a forward voltage drop of LED 40. In the event that in stage 4030 the change is indicative of a short circuit LED 40, in stage 4050 control circuitry 910 outputs a failure indication, preferably including a notification that the failure indication is associated with a short circuit LED 40 and further including the identification of the LED 40 as read from LED identification functionality 920. In stage 4060, LED identification functionality 920 is indexed to the next LED 40 in LED string 45. Stage 4000 as described above is then performed.

In the event that in stage 4030 the change is not indicative of a short circuit in LED 40, in stage 4040 the comparison of stage 4020 is reviewed to determine if it is indicative of an open circuit LED 40. In the event that the change is indicative of an open circuit LED 40, in stage 4050 control circuitry 910 outputs a failure indication, preferably including a notification that the failure indication is associated with an open circuit LED 40 and further including the identification of the LED 40 as read from LED identification functionality 920.

In the event that in stage 4040 the change is not indicative of an open circuit LED 40 in LED string 45, stage 4060 as described above is performed.

Thus, the method of FIG. 7B is operative to periodically compare the voltage drop across each LED 40 with a previous measurement of the voltage drop across the particular LED 40. Responsive to the comparison, control circuitry 910 identifies an open circuit LED 40 and a short circuit LED 40 and outputs a failure identification and indication accordingly.

Thus the present embodiments enable a fault detection mechanism operable to periodically measure the voltage drop across one of the LED string and each individual LED in the LED string. A plurality of measurements, preferably consecutive measurements, are compared, and in the event of a change in voltage drop indicative of one of a short circuit LED and an open circuit LED, a failure indicator is output.

Detection of a short circuit LED or an open LED in the LED string is preferably accomplished by a fault detection mechanism arranged to measure a voltage drop across each LED in the LED string. Preferably, an indication of the location or other identification of the failed LED in the LED string is transmitted to a chromatic control circuit of the LCD monitor. The chromatic control circuit is preferably operable to at least partially compensate for the failed LED by modifying the chromatic response associated with a transmissive portion of the LCD monitor to at least partially compensate for the identified failed LED.

In one embodiment, a passive self healing mechanism is further provided in parallel with each LED in the LED string, the passive self healing mechanism being arranged to bypass an open LED in response to the increased voltage drop. In another embodiment, a FET or other electronically controlled switch is provided for each LED in the LED string, the FET or other electronically controlled switch being arranged to create a bypass path for an open LED. In the event of a detected open LED in the LED string, the FET or other electronically controlled switch arranged in parallel with the open LED is closed thereby bypassing the open LED.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A fault detection mechanism for a light emitting diode (LED) string comprising a plurality of serially connected LEDs, the fault detection mechanism comprising:

a control circuitry;

a voltage measuring means in communication with said control circuitry, arranged to measure the voltage drop across at least one LED of the LED string; and a multiplexer, responsive to said control circuitry, arranged to connect said voltage measuring means across each of said LEDs in the LED string in turn, said control circuitry arranged to:

measure said voltage drop, via said voltage measuring means, at a plurality of times;

compare at least two of said measured voltage drops; and in the event said comparison of said at least two voltage drops is indicative of one of a short circuit LED and an open circuit LED, output a fault indicator.

2. A fault detection mechanism according to claim 1, wherein said at least two measured voltage drops are consecutive measured voltage drops.

3. A fault detection mechanism according to claim 1, wherein each of said plurality of LEDs is arranged with one of a serially connected diode string, a Zener diode and a voltage source connected in parallel thereto, each of said serially connected diode string, Zener diode and voltage source being configured to conduct at a voltage higher than the nominal operating voltage drop of the LED to which it is connected in parallel.

4. A fault detection mechanism according to claim 3, wherein the difference between said voltage higher than said nominal operating voltage and said nominal operating voltage presents a voltage differential indicative of an open LED.

5. A fault detection mechanism according to claim 3, wherein in the event the difference between a first of said at least two measured voltages and a second of said at least two measured voltage drops is within a range of the difference between said voltage higher than said nominal operating voltage and said nominal operating voltage, said comparison is indicative of a open circuit LED.

6. A fault detection mechanism according to claim 1, wherein in the event the difference between a first of said at least two measured voltages and a second of said at least two measured voltage drops is within a range of an operating voltage drop across a single LED of the LED string, said comparison is indicative of a short circuit LED.

7. A fault detection mechanism according to claim 1, wherein said control circuitry is further operable to transmit an indication of the particular LED associated with said fault indicator.

8. A fault detection mechanism according to claim 7, further comprising a LCD chromatic control operable, responsive to said transmitted indication of said particular LED associated with said fault indicator, to adjust the color response of the liquid crystal display to at least partially compensate for said detected LED associated with said fault indicator.

9. A fault detection mechanism according to claim 7, further comprising a control unit responsive to said transmitted indication, said control unit being operable to adjust a PWM control thereby at least partially compensating for said particular LED associated with said fault indicator.

10. A fault detection mechanism according to claim 1, wherein said LED string is configured for use in backlighting one of a monitor and a television.

11. A fault detection mechanism according to claim 1, further comprising:

a plurality of field effect transistors, one of each of said plurality of field effect transistors being connected across a unique one of the plurality of LEDs in the LED string and being responsive to an output of said control circuitry;

said control circuitry being further operable, in the event said comparison is indicative of an open circuit LED, to operate the field effect transistor connected across said open circuit LED so as to conduct current.

12. A fault detection mechanism according to claim 11, further comprising:

a control unit in communication with said fault indicator, wherein said control circuitry is further operable to transmit an indication of the particular LED associated with said fault indicator, and wherein said control unit is further operable to disable at least one LED thereby at least partially compensating for said one of a short circuit LED and an open circuit LED.

13. A method of fault detection comprising:

providing an light emitting diode (LED) string comprising a plurality of LEDs;

measuring a voltage drop across at least one LED of said provided LED string at a plurality of times;

comparing at least two of said measured voltage drops; and outputting, in the event said comparison of said at least two voltage drops is indicative of one of a short circuit LED and an open circuit LED, a fault indicator;

determining the particular LED associated with said fault indicator; and adjusting a color response of a liquid crystal display associated with said provided LED string to at least partially compensate for said particular LED associated with said fault indicator.

14. A method according to claim 13, wherein said at least two measured voltage drops are consecutive measured voltage drops.

15. A method according to claim 13, further comprising:

providing, associated with each LED of said provided LED string one of a serially connected diode string, a Zener diode and a voltage source connected in parallel thereto; and configuring each of said one of a serially connected diode string, Zener diode and voltage source to conduct at a voltage higher than the nominal operating voltage drop of the LED to which it is connected in parallel.

16. A method according to claim 15, wherein the difference between said voltage higher than said nominal operating voltage and said nominal operating voltage presents a voltage differential indicative of an open LED.

17. A method according to claim 15, wherein in the event the difference between a first of said at least two measured voltages and a second of said at least two measured voltage drops is within a range of the difference between said voltage higher than said nominal operating voltage and said nominal operating voltage, said comparison is indicative of a open circuit LED.

18. A method according to claim 13, wherein in the event the difference between a first of said at least two measured voltages and a second of said at least two measured voltage drops is within a range of an operating voltage drop across a single LED of the LED string, said comparison is indicative of a short circuit LED.

19. A method according to claim 13, further comprising adjusting a PWM control thereby at least partially compensating for said particular LED associated with said fault indicator.

20. A method according to claim 13, further comprising:

enabling, in the event said fault indicator is indicative of an open circuit LED, a parallel conductive path around said open circuit LED.

21. A method according to claim 13, further comprising:

disabling at least one LED, thereby at least partially compensating for said one of a short circuit LED and an open circuit LED.

22. A method of fault detection comprising:

providing an LED string;

providing a voltage measuring means;

providing a multiplexer arranged to connect said provided voltage measuring means across each of said LEDs in the provided LED string in turn;

measuring, via said provided multiplexer and voltage measuring means, a voltage drop across at least one LED of an LED string at a plurality of times;

comparing at least two of said measured voltage drops; and outputting, in the event said comparison of said at least two voltage drops is indicative of one of a short circuit LED and an open circuit LED, a fault indicator.

23. A method according to claim 22, wherein said at least two measured voltage drops are consecutive measured voltage drops.

24. A fault detection and compensation mechanism for a light emitting diode (LED) string comprising a plurality of serially connected LEDs, the fault detection and compensation mechanism comprising a control circuitry in communication with an LCD chromatic control unit, the control circuitry arranged to:

measure a voltage drop across at least one LED of an LED string at a plurality of times;

compare at least two of said measured voltage drops;

in the event said comparison of said at least two voltage drops is indicative of one of a short circuit LED and an open circuit LED, output a fault indicator;

determine the particular LED associated with said fault indicator; and output an indication of the particular LED associated with said fault indicator to the LCD chromatic control unit, said LCD chromatic control unit arranged to adjust a color response of a liquid crystal display associated with said provided LED string to at least partially compensate for said particular LED associated with said fault indicator.

25. A fault detection mechanism according to claim 24, wherein said at least two measured voltage drops are consecutive measured voltage drops.

* * * * *